United States Patent [19]

Vogelsanger

[11] Patent Number: 6,092,290
[45] Date of Patent: Jul. 25, 2000

[54] RESCUE TOOL

[75] Inventor: Bruno Vogelsanger, Oregon City, Oreg.

[73] Assignee: Rescue Technology, Inc., Clackamas, Oreg.

[21] Appl. No.: 09/108,662

[22] Filed: Jul. 1, 1998

Related U.S. Application Data

[63] Continuation-in-part of application No. 08/772,934, Dec. 24, 1996, Pat. No. 5,953,822, and a continuation-in-part of application No. 08/773,024, Dec. 24, 1996, Pat. No. 5,875,554, and a continuation of application No. PCT/US97/24150, Dec. 24, 1997, which is a continuation-in-part of application No. 08/773,024, Dec. 24, 1996, Pat. No. 5,875,554.

[51] Int. Cl.[7] .................................................. B26B 15/00
[52] U.S. Cl. ........................ 30/228; 30/258; 30/134
[58] Field of Search ............................. 30/134, 228, 229, 30/258, 279.2, 245

[56] References Cited

U.S. PATENT DOCUMENTS

| | | | |
|---|---|---|---|
| 2,273,376 | 2/1942 | Reynolds | 30/258 |
| 2,522,006 | 9/1950 | Wilcox . | |
| 3,262,201 | 7/1966 | Docken | 30/228 |
| 3,362,071 | 1/1968 | Schmidt | 30/258 |
| 3,819,153 | 6/1974 | Hurst et al. . | |
| 4,283,851 | 8/1981 | Wolter | 30/134 |
| 4,300,496 | 11/1981 | Price . | |
| 4,392,263 | 7/1983 | Amoroso | 30/228 |
| 4,734,983 | 4/1988 | Brick . | |
| 4,750,568 | 6/1988 | Roxton et al. . | |
| 4,872,264 | 10/1989 | LaBounty | 30/310 |
| 5,063,670 | 11/1991 | Eberhardt et al. . | |
| 5,125,158 | 6/1992 | Casebolt et al. . | |
| 5,172,479 | 12/1992 | Keeton | 30/228 |
| 5,187,868 | 2/1993 | Hall | 30/228 |
| 5,243,761 | 9/1993 | Sullivan et al. . | |
| 5,272,811 | 12/1993 | Armand | 30/228 |
| 5,421,230 | 6/1995 | Flaherty et al. . | |
| 5,465,490 | 11/1995 | Smith et al. . | |
| 5,474,278 | 12/1995 | Cleveland . | |
| 5,566,454 | 10/1996 | Eisenbraun | 30/228 |
| 5,636,802 | 6/1997 | Tagawa | 30/124 |
| 5,875,554 | 3/1999 | Vogelsanger | 30/228 |
| 5,953,822 | 9/1999 | Vogelsanger | 30/228 |

FOREIGN PATENT DOCUMENTS

| | | | |
|---|---|---|---|
| 887578 | 7/1953 | Germany | 30/228 |

*Primary Examiner*—Hwei-Siu Payer
*Attorney, Agent, or Firm*—Klarquist Sparkman Campbell Leigh & Whinston, LLP

[57] ABSTRACT

A portable, hydraulically powered rescue tool has a cutting head, a hydraulic motor, a battery-powered hydraulic fluid pump, and controls necessary for operation of the tool. The cutting blades are shaped so that, when the tool is in use, the blades take bites of material out of the object to be cut.

2 Claims, 17 Drawing Sheets

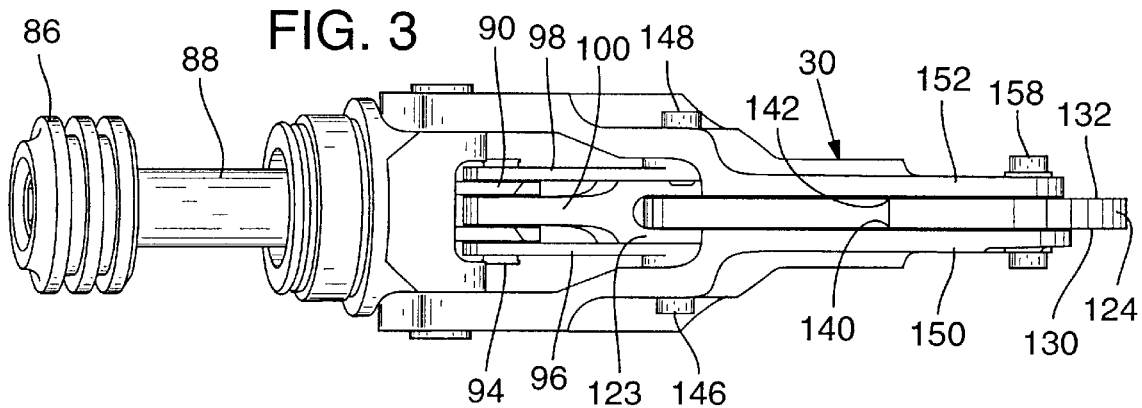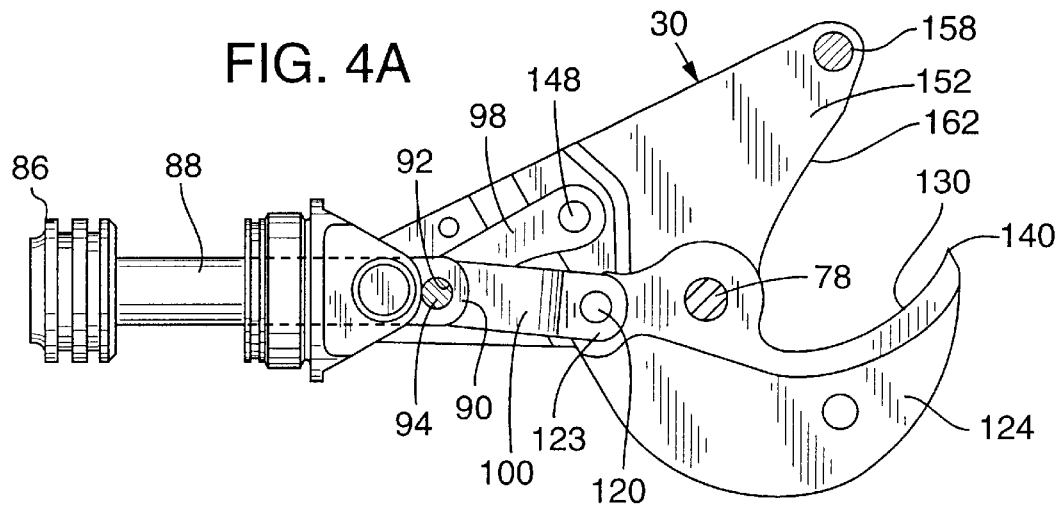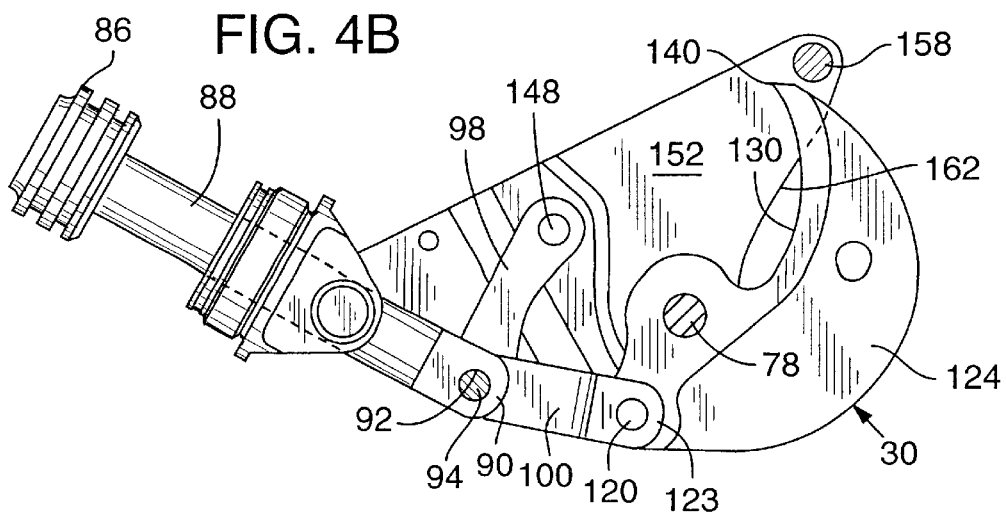

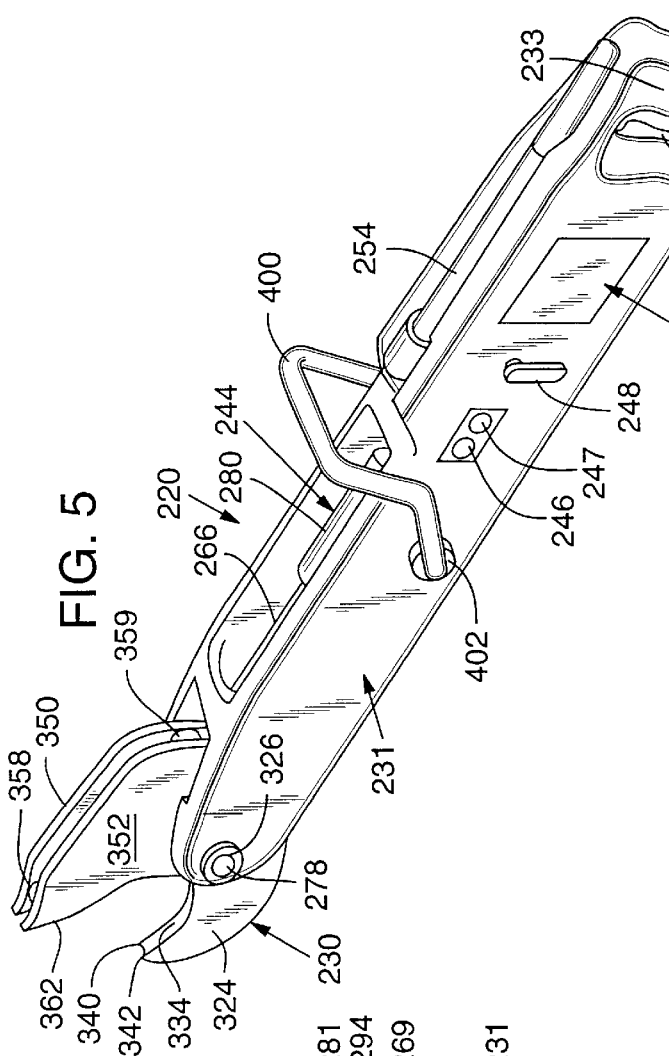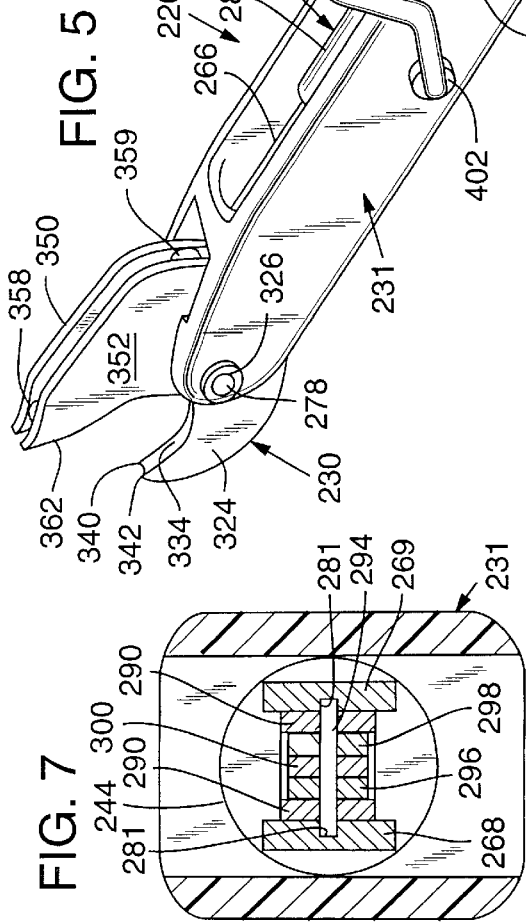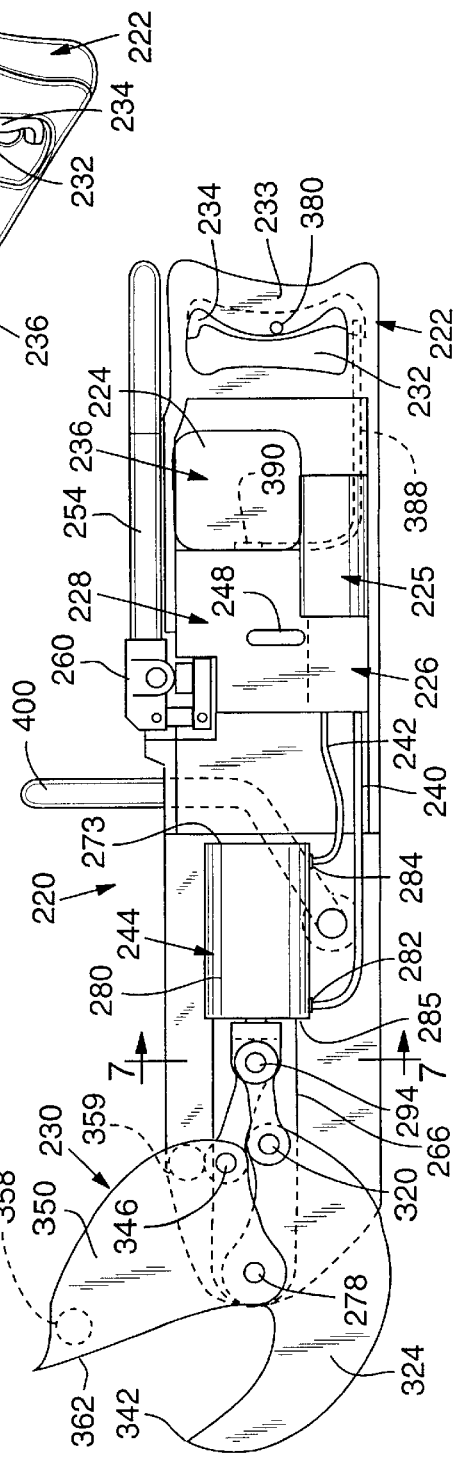

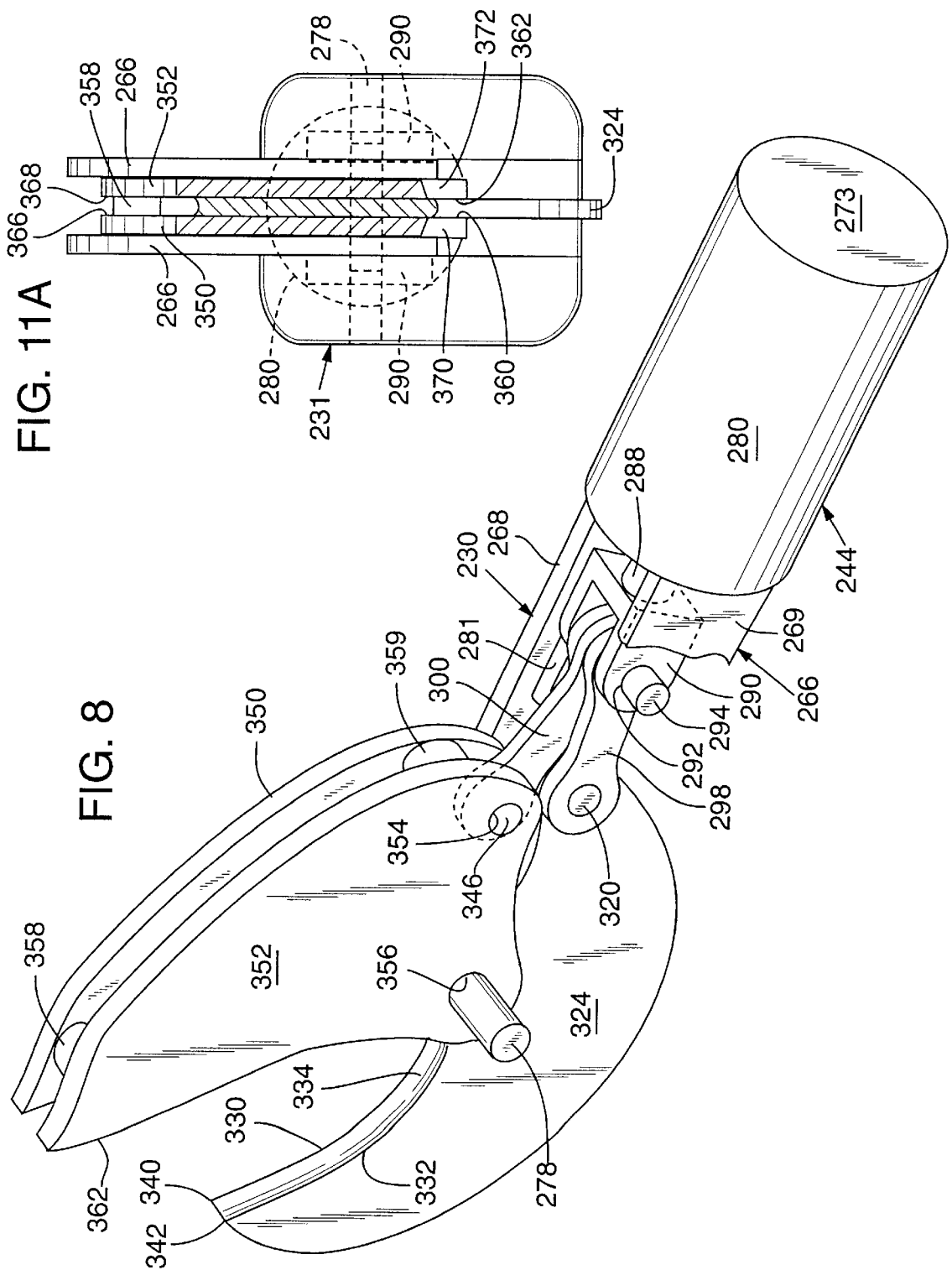

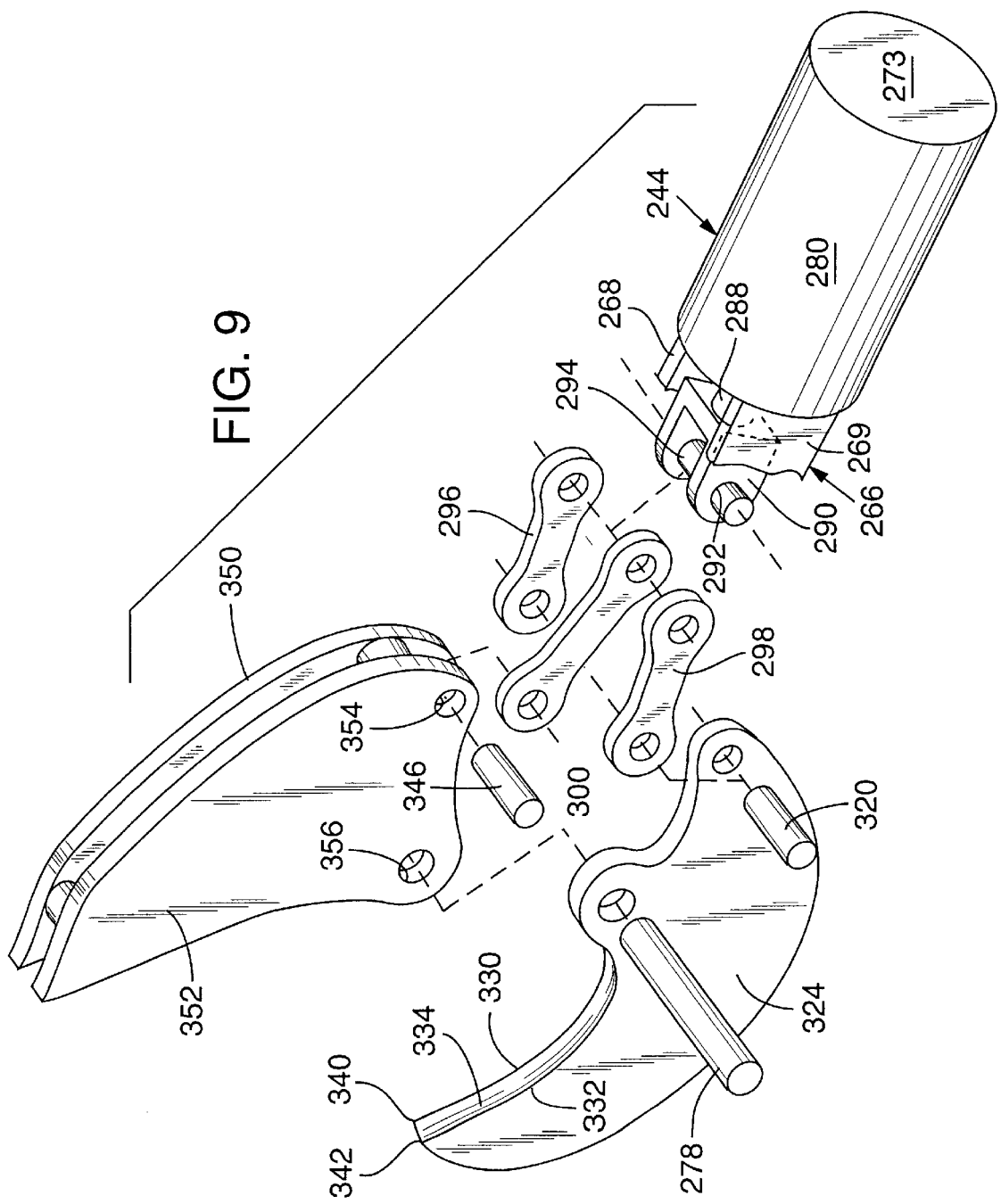

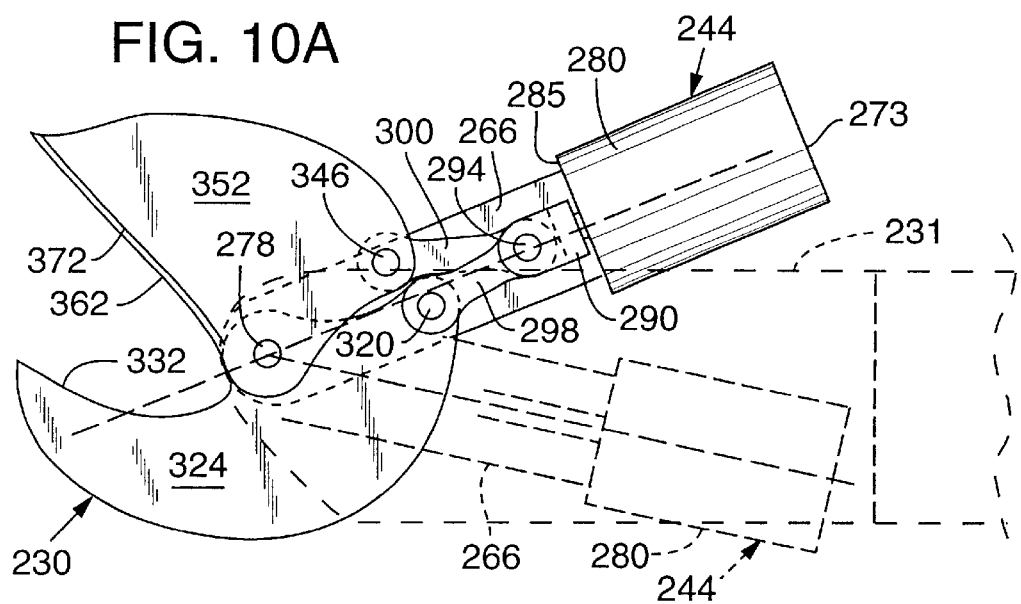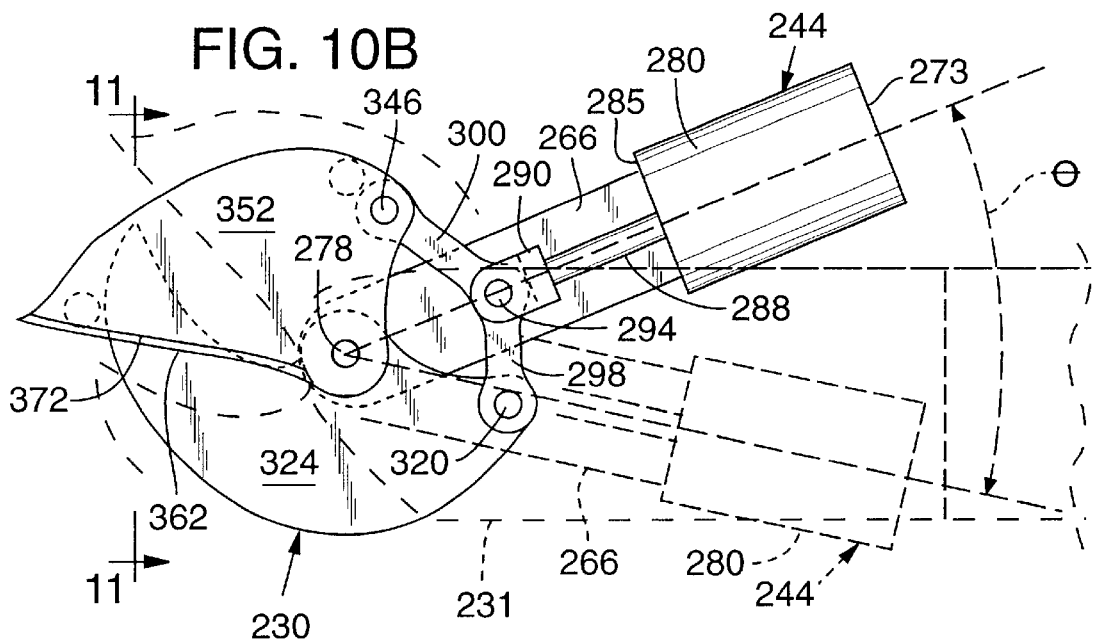

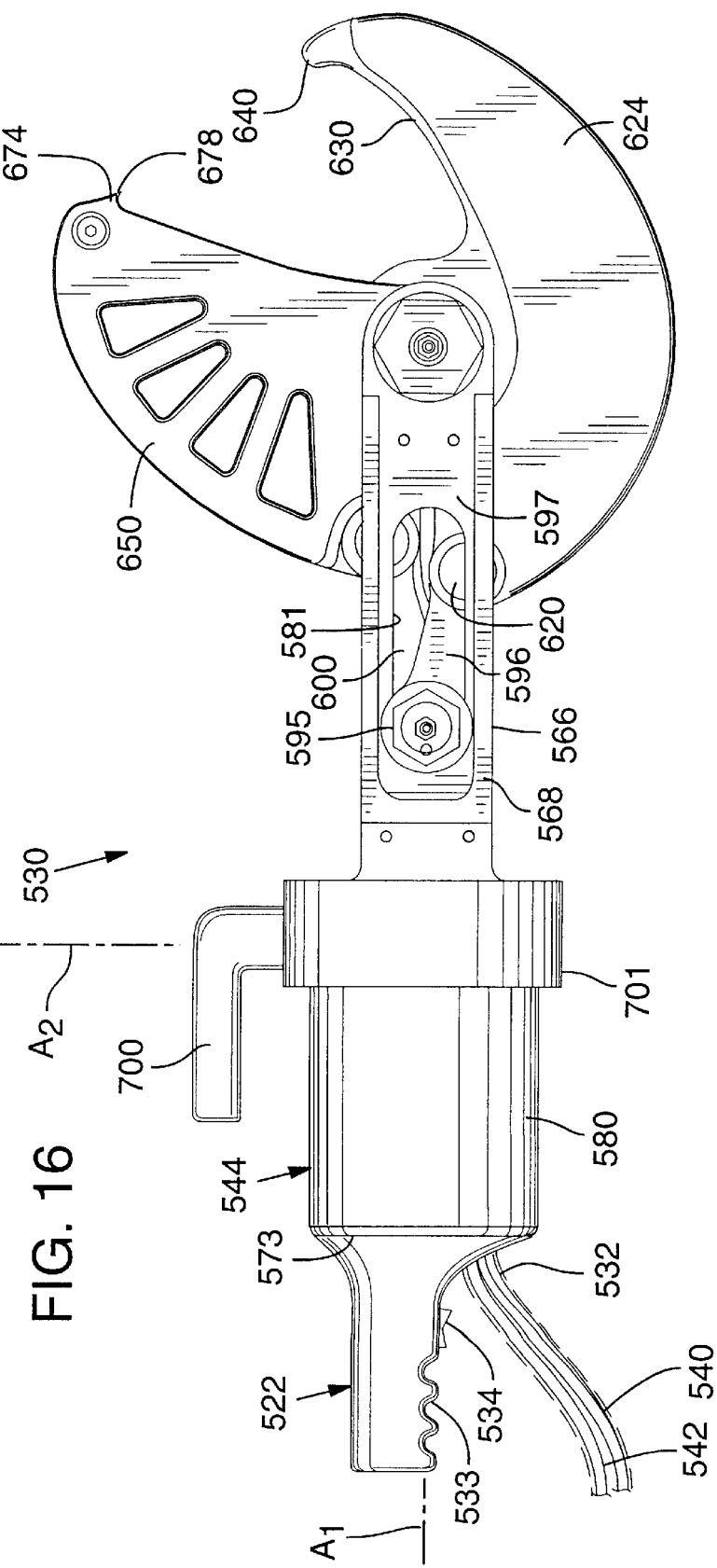

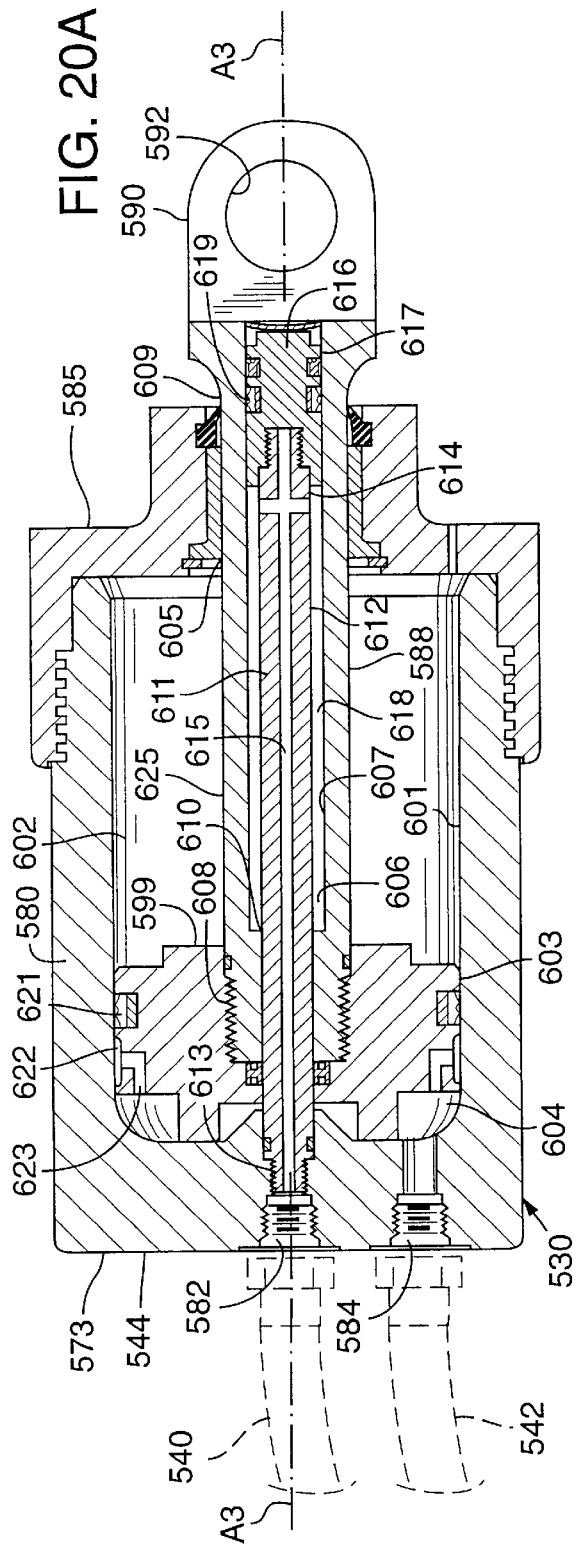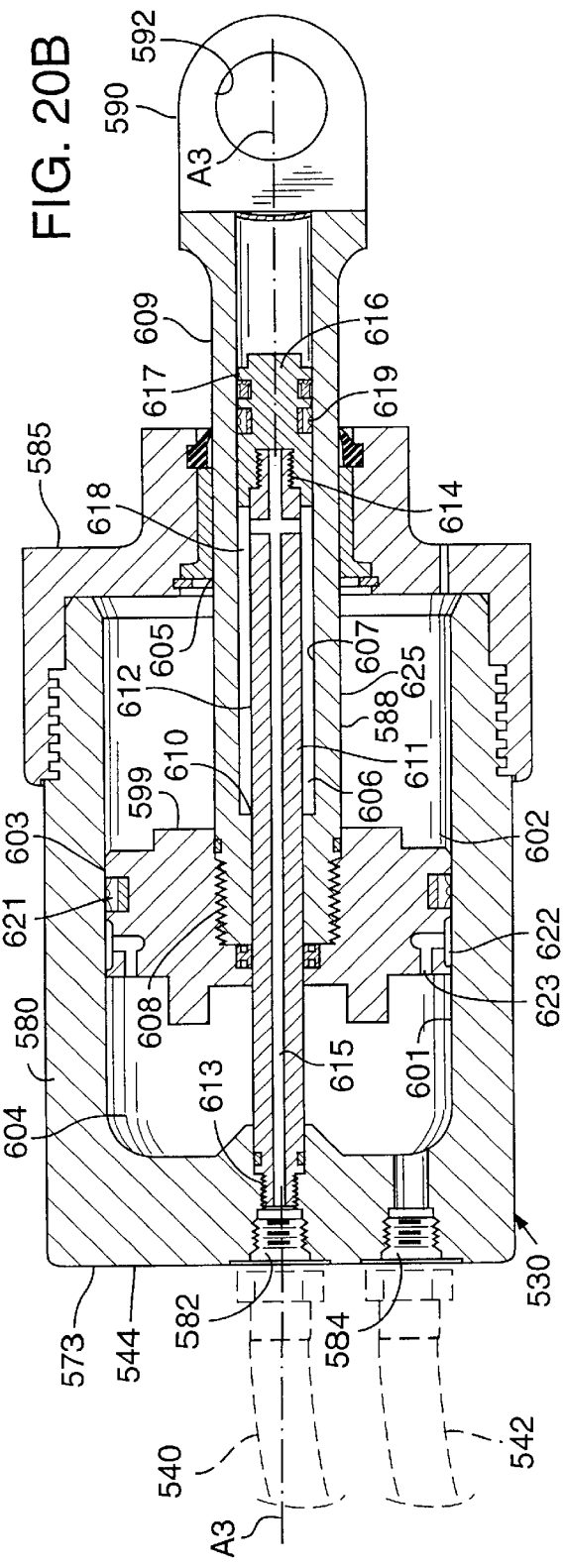

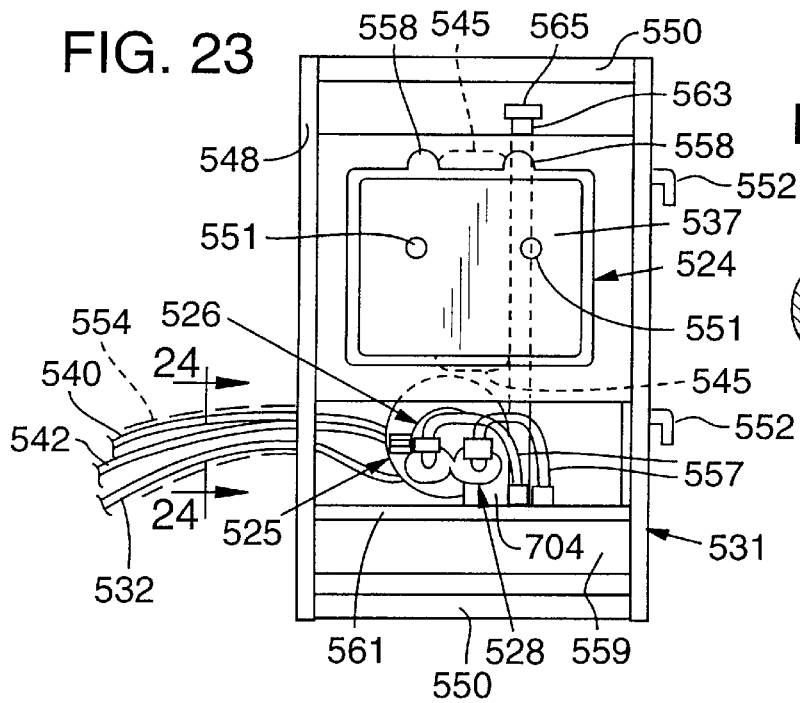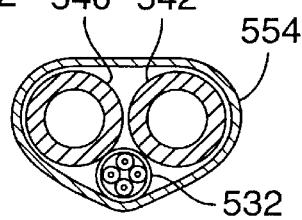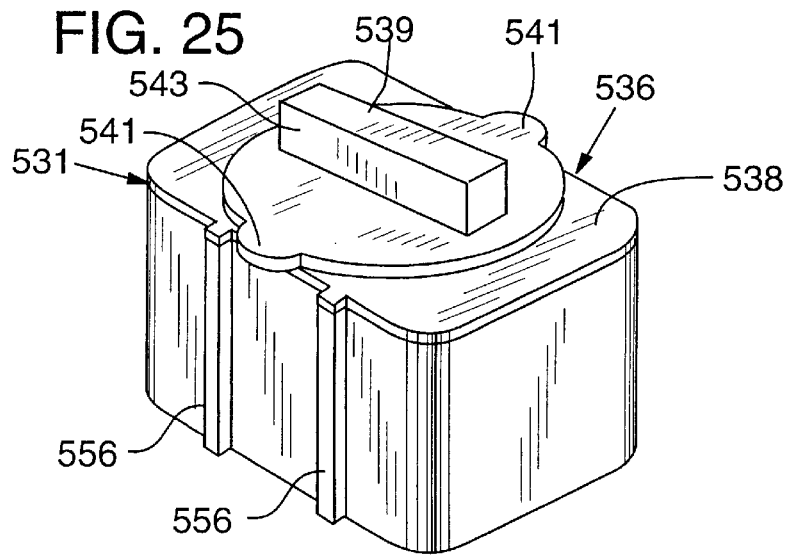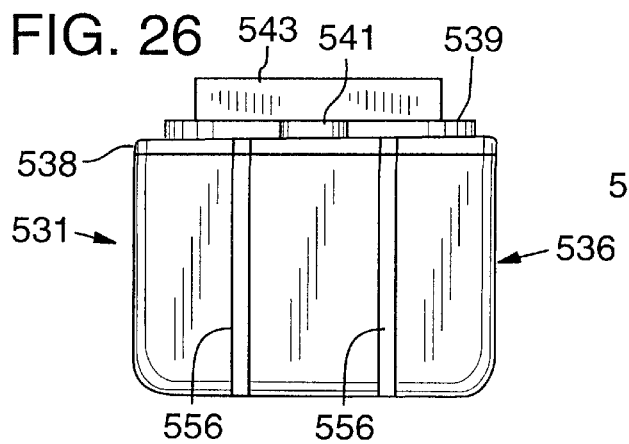

RESCUE TOOL

RELATED APPLICATION DATA

This is a continuation-in-part of U.S. application Ser. No. 08/772,934, filed Dec. 24, 1996, now U.S. Pat. No. 5,953,822, and U.S. application Ser. No. 08/773,024, filed Dec. 24, 1996, now U.S. Pat. No. 5,875,554, and is a continuation of PCT Application No. US97/24150, filed Dec. 24, 1997, which is a continuation-in-part of U.S. application Ser. No. 08/773,024 U.S. Pat. No. 5,875,554.

BACKGROUND OF THE INVENTION

The present invention relates to fluid-powered tools that are used to apply force where needed in a rescue operation, such as to cut open an automobile at the site of a collision.

A variety of rescue tools have been developed to help at the site of emergency operations. These tools are designed to exert force on an object, such as an automobile body, that needs to be cut or pried open. Tools of this type must be sufficiently portable to be used in remote sites, and must have a power source that does not rely on the availability of electrical outlets. Since spilled gasoline is a common occurrence at accident sites, the tool should be able to operate without making sparks or heat sufficient to ignite gasoline fumes.

The most well known of rescue tools, commonly referred to as "jaws of life," employs two arms that are pivotally connected. The arms can be moved toward or away from each other by a hydraulic motor which is connected by hydraulic lines, to a remote pump powered by an internal combustion engine. An example of such a device is shown in U.S. Pat. No. 3,819,153 (Hurst, et al.).

Other rescue tools are designed for cutting or shearing through materials such a sheet metal and plastic. These are used for operations such as cutting into a wrecked automobile body to free a trapped passenger. Although of some use, no commercial cutting tool has proven to be fully functional due to problems with the design of the cutting heads used with such tools.

It is a common problem of existing powered rescue tools that they are bulky and awkward to hold and operate. Some of the more commonly used tools are quite dangerous to use. Some such tools apply great forces in ways that can surprisingly twist a tool from a user's grip. In many cases, it is necessary to hold the tool in an elevated position or at an awkward angle such that the operator does not have good footing or balance when using the tool. This can lead to physical injury of the operator, nearby rescue workers, or the person being rescued.

Due to the danger, many types of rescue tools are intended to be used only by operators who are given periodic training in use of the tool. If there is no trained operator at the scene of an accident, the tool must go unused.

Thus, there remains a need for a rescue tool that is easy to operate and that is easy for a single operator to hold and position for cutting operations.

SUMMARY OF THE INVENTION

The present invention is a rescue tool of the type that cuts through metal and numerous other types of materials. It is particularly useful for cutting through composite materials comprising multiple layers of differing compositions.

The tool includes a cutting head, a hydraulic motor, a battery-powered hydraulic fluid pump, and controls necessary for operation of the tool.

One advantageous tool is self-contained and includes a cutting head that is pivotally mounted so that the angle of attack of the cutting blades can be adjusted and the tool body can be held at an angle that is convenient to the operator. This is best accomplished by use of a cutting head that has both cutting blades and a hydraulic actuator mounted on a frame that is tiltable in relation to the body of the tool.

Another advantageous tool has a compact, light-weight cutting head, connected by flexible hydraulic and electrical lines to a power unit which includes a hydraulic motor and a battery-powered hydraulic fluid pump.

The controls of the tools are simple to learn and use so that an operator does not require a great deal of training. The cutting head is designed so that, when the tool is in use, there is little risk of torque which would twist the tool out of the grasp of the operator.

BRIEF DESCRIPTION OF THE DRAWINGS

In the drawings:

FIG. 3 is an enlarged, top plan view of the cutter head of the rescue tool of FIG. 1;

FIGS. 4A and 4B are side elevational views of the cutter head of FIG. 3, with portions of the foreground structure removed to show interior detail, the cutting head members being in open and closed positions respectively;

FIG. 5 is an oblique view of a second rescue tool;

FIG. 6 is a side elevational view of the rescue tool of FIG. 5 with a portion of the outer casing removed to show internal detail;

FIG. 7 is a vertical sectional view taken along line 7—7 of FIG. 6;

FIG. 8 is an enlarged, oblique view of the cutter head of the rescue tool of FIG. 5;

FIG. 9 is an exploded view of the cutter head of FIG. 8;

FIGS. 10A and 10B are side elevational views of the cutter head of FIG. 8, with cutting head members in open and closed positions respectively;

FIG. 11A is a vertical sectional view taken along line 11—11 of FIG. 10B;

FIG. 16 is a side elevational view of a cutter module of a third rescue tool;

FIGS. 20A and 20B are enlarged, vertical sectional views of a hydraulic cylinder taken along line 20—20 of FIG., when the cutting head members are in open and closed positions respectively;

FIG. 23 is a right side elevational view of the power module of FIG. 21;

FIG. 24 is a sectional view taken along line 24—24 of FIG. 23;

FIG. 25 is an oblique view of a battery pack of the third rescue tool;

FIG. 26 is a front elevational view of the battery pack of FIG. 25; and

FIG. 27 is a bottom plan view of the battery pack of FIG. 25.

DETAILED DESCRIPTION

Figure 1:
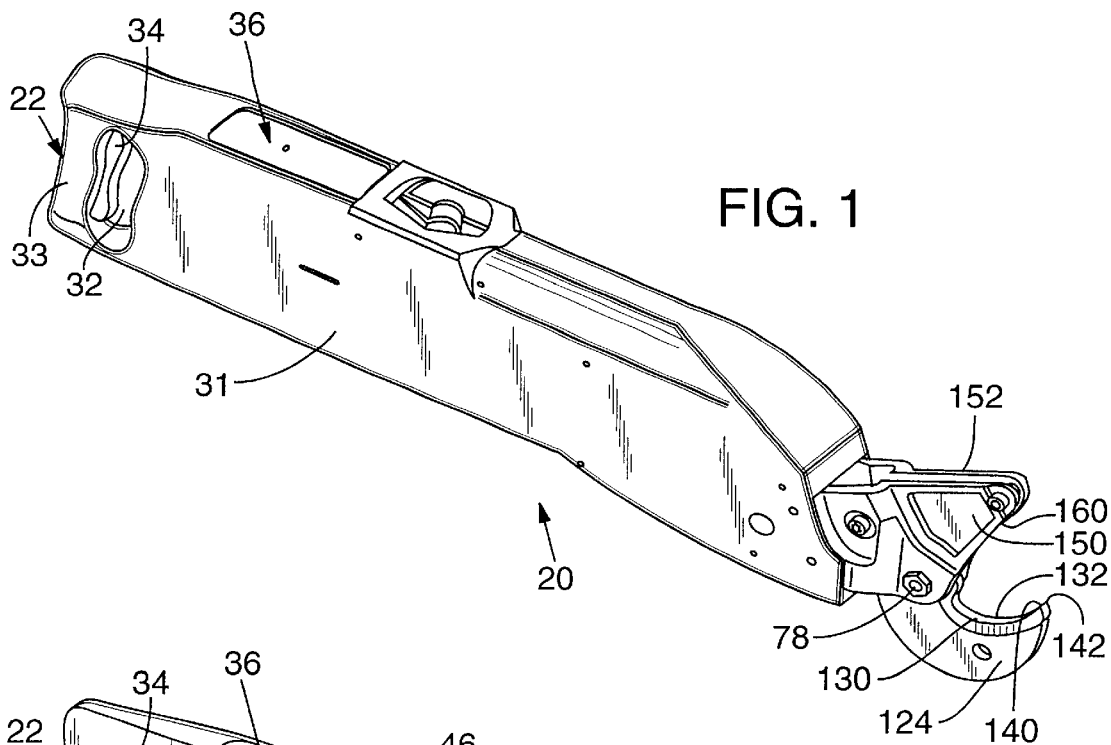
FIG. 1 is an oblique view of a rescue tool.
Figure 2:
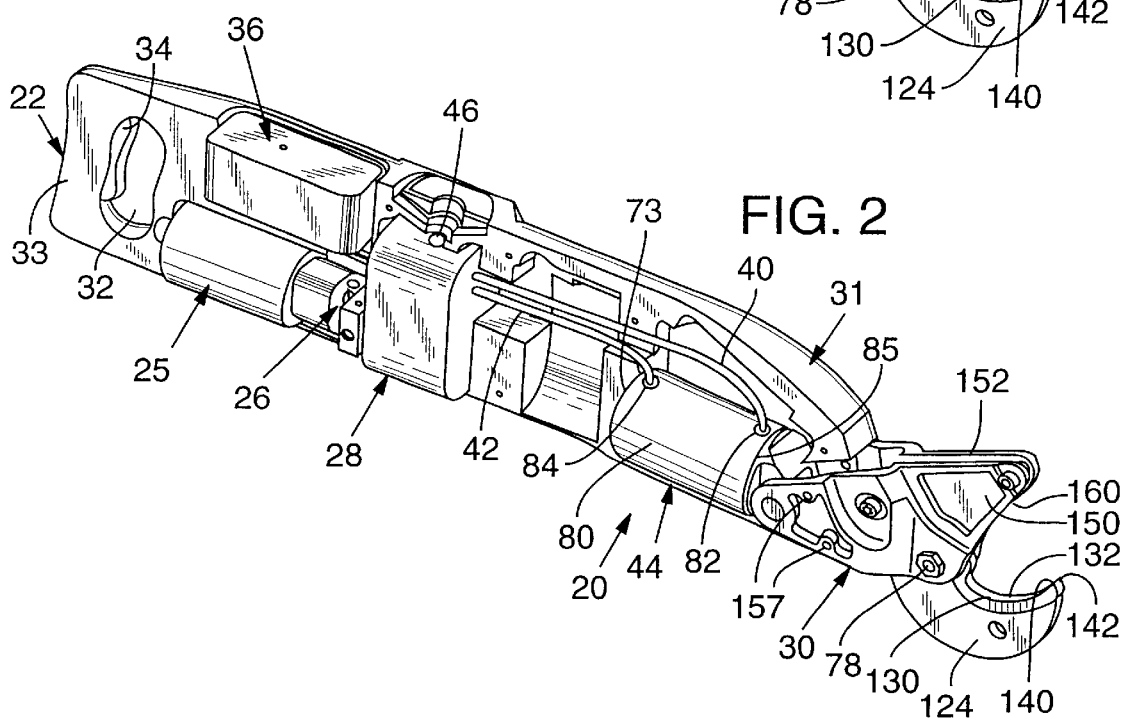
FIG. 2 is an oblique view of a rescue tool of FIG. 1 with a portion of the outer casing removed to show internal detail.

FIGS. 1–4 show a first rescue tool 20. As best seen in FIG. 2, the tool comprises several modules including a handle 22, a battery pack 36, a motor 25, a motor-powered hydraulic pump 26, a hydraulic fluid manifold 28, and a cutter head 30 mounted in a housing 31. Since the tool 20 may be used is areas where there is spilled fuel, it is best to use explosion proof electrical components where possible, and to contain all electrical components inside the housing 31.

The handle section 22 is primarily to give the operator a gripping surface at the end of the tool that is distal from the cutter head. In the illustrated embodiment, the handle defines finger opening 32 and includes a hand grip 33. A three-position switch, such as the illustrated rocker switch 34, is conveniently positioned on the handle 22 facing the finger opening 32 so that the operator can control the hydraulic and electrical systems of the tool as described below.

The switch is in an electrical circuit that connects the battery pack 36 to the electric motor 25 which mechanically drives the pump 26. In a first position, the switch opens the electrical circuit so that no fluid is pumped. In second and third positions, the switch causes the motor to operate and thereby pump hydraulic fluid. The switch 34 also controls a valve in the hydraulic system so that when the switch is in the second position, hydraulic fluid exerts pressure on the piston of a hydraulic actuator in one direction, and when the switch is in the third position, the hydraulic fluid exerts pressure on the piston of the hydraulic actuator in the opposite direction. An electrical or mechanical safety lock switch (not shown) could be provided to guard against inadvertent triggering of the switch 34 when the tool is not intended to be in use, although such a safety lock switch is of questionable value since it might fail or delay operation of the tool during an emergency.

The rechargeable battery pack 36 has simple electrical connections so that it can readily can be replaced as needed in the field. Each tool 20 should be stored with at least one spare, charged battery pack 36 to serve as a back-up. Preferably the battery pack will contain multiple nickel cadmium (NiCad) cells.

The pump module 26 delivers pressurized hydraulic fluid for distribution by the manifold 28. The primary purpose of the manifold is to establish a hydraulic circuit, including hoses 40, 42 which serve as conduits deliver high pressure hydraulic fluid to power a hydraulic motor, in particular a hydraulic actuator 44 which is a part of the cutter head 30.

The manifold 28 also has a port 46 which is accessible from the top of the tool. The port 46 has dropless quick couplers for attaching external hydraulic hoses (not shown) for powering the external device. Typically the external or auxiliary device will have its own associated flow controls for manipulation by the operator. The operator can disconnect the cutter head circuit and direct pressurized fluid to the port 46 by operating a valve (not shown) associated with the manifold.

The illustrated actuator 44 is a double acting hydraulic cylinder which includes a body 80. The body defines two ports 82, 84 which communicate with the hoses 40, 42 and which has a first end 73 and second end 85. A piston 86 is located inside the body between the ports 82, 84 and is connected to a piston rod 88 that extends through an opening defined by the second end 85 of the body 80. A clevis bracket 90, mounted at the outer end of the rod 88, defines two openings 92 which receive a pin 94.

The pin 94 pivotally secures three linkage arms 96, 98, 100 to the piston rod 88 with arm 100 sandwiched between arms 96, 98. Each of the arms is elongated and defines two openings to receive pivot pins. In each case, one of the openings receives the pin 94.

The cutter head 30 has multiple cutting members which are movable relative to one another. In particular, the arm 100 is forked, at its end distal from the rod 88, to form a clevis bracket 123 which receives a cutter blade 124. The blade 124 defines two openings. A first opening receives a pin 120 and a second opening receives a pin 78 in such a manner that the blade 124 can pivot about both pins. The blade 124 has two curved cutting edges 130, 132 that lie in parallel planes and that are directly opposed and of identical curvature. The edges 130, 132 extend to piercing points 140, 142 at the outermost end of the blade.

The other of the openings of arms 96, 98 receive pins 146, 148 which pivotally connect the arms 96, 98 to two anvil blades 150, 152. Pins 78, 94, 120, 146, and 148 have axes of rotation, all of which extend in parallel to each other in the illustrated embodiment, and all of which are perpendicular to the planes which contain the cutting edges 130, 132.

The blades 150, 152 also define second openings which receive the pin 78 so that the blades 124, 150, 152 are pivotally secured together. The blades 150, 152 are fixedly secured to the casing 31 by screws (not shown) that are received in screw sockets 157. Blades 150, 152 have cutting edges 160, 162 that lie in parallel planes and that are directly opposed and of identical curvature. A spacer 158 is secured between the anvil blades 150, 152 by a screw or bolt to maintain the cutting edges 160, 162 a precise distance apart.

The cutting edges 160, 162 of the anvils 150, 152 and the cutting edges 130, 132 of the blade 124 are shaped such that, when the motor 25 operates at a constant speed, the junction of each edge 130, 132 of the blade and the corresponding edge 160, 162 of the adjacent anvil moves at a constant speed along the edge of the blade.

The tool best is operated by a person who has received basic training in its workings. But, because the operation is largely intuitive, the tool can be used in an emergency by almost any person who is strong enough to lift it. The operator first determines whether it is desirable to perform a cutting operation or whether an auxiliary tool should be used. If the cutter head 30 is to be used, the valve which operates the auxiliary ports 46 is turned off and the hand switch 34 is operated. Rocking the hand lever 34 in one direction causes the blades 124, 150, 152 to open. Rocking the hand lever 34 in the opposite direction causes the blades to close.

If the tool is stored with the blades in the closed position, the operator operates the hand lever 34 to open the blades. Next the tool is positioned so that the object to be cut is received between the upper blades 150, 152 and the lower blade 124. The operator then rocks the hand lever to the position which causes the blades to close, that is, to move from the position shown in FIG. 4A to the position shown in FIG. 4B. This operation involves the pumping of hydraulic fluid through the line 42 and into the actuator 44. The fluid pumped into the actuator causes the rod 88 to extend and push the pin 94 away from the actuator. This motion of the pin 94 causes the pin 120 to move away from the pins 146, 148, thereby rotating the blade 124 about the pin 78 relative to the anvils 150, 152. Because the anvils are mounted in a fixed position relative to the casing 31, the actuator body 80 rotates about the pin 94 and moves upwardly, inside the casing 31, as illustrated by the elevated position of the piston 86 in FIG. 4B.

As the blades move toward the closed position, the object to be cut is first grasped by the piercing points 140, 142 which anchor the object against the anvil blades 150, 152. This arrangement inhibits any slipping of the tool relative to the workpiece during the cut. The cut proceeds with the cutting edges 130, 132 of the blade 124 overlapping and traveling along the cutting edges 160, 162 of the blades 150, 152. When the blades 124, 150, 152 completely overlap, an elongated bite or strip of limited length has been taken out of the object to be cut. After a first strip is cut from the object, if necessary, a second bite can be taken from the same object by opening the blades, sliding the blade 124 forward into the gap left by removal of the first bite, and then closing the blades to take a second bite. Because an area of material is removed each time a bite is taken and because at least one of the cutting members is no wider than the strip that is cut away, it is possible to keep moving the cutter head 30 forward through the workpiece as many times as is necessary to cut additional strips from the workpiece until it is cut through completely.

FIGS. 5–12 illustrate a second rescue tool. As best seen in FIG. 6, the tool 220 comprises a cutter head 230 pivotally mounted in a support member or housing 231 which has or contains several modules including a handle 222, a battery pack 236, an electrically-powered motor 225, a hydraulic pump 226, and a hydraulic fluid manifold 228.

The support member 231 is sized and shaped so that it can be held and manipulated by a rescue worker. The handle section 222 defines finger opening 232 and includes a handgrip 233. A three-position switch 234 is positioned on the handle 222 so that the operator can control the hydraulic and electrical systems of the tool.

The switch 234 is in an electrical circuit that connects the battery pack 236 to the electric motor 225. In a first position, the switch opens the electrical circuit so that no fluid is pumped. In second and third positions, the switch causes the motor to operate and thereby pump hydraulic fluid. The switch 234 also controls a valve in the hydraulic system so that when the switch is in the second position, hydraulic fluid exerts pressure on a hydraulic motor in one direction, and when the switch is in the third position, the hydraulic fluid exerts pressure on the hydraulic motor in the opposite direction.

A battery compartment 224 is provided inside the housing 231 to contain the rechargeable battery pack 236. The battery pack is shaped to conform to an opening in the side of the housing 231 and interacts with a latch mechanism (not shown) so that the battery pack 236, when installed, is latched in place and fills the opening with one wall of the battery pack forming a portion of the side of the housing. Because one wall of the battery pack forms a part of the housing 231, the absence of a battery pack will be readily apparent to the operator. This helps to prevent an operator from forgetting to install a battery pack before transporting the tool 220 for use in a remote location. The battery pack readily can be removed and replaced with a charged battery pack as needed in the field.

A power source other than the battery pack can be used in an emergency situation. When a battery pack is removed, the tool's electrical battery contacts (not shown) are exposed. Any source of sufficient electrical current can be connected to the contacts to power the tool. The preferred electrical system operates at twelve volts, so an automotive battery or twelve volt generator can be wired to the contacts for operation of the tool when no charged battery packs are available. To facilitate such emergency operation, it is helpful for the tool electrical circuit to contain overload protection and to have the ability to operate regardless of the polarity of the power source connections to the battery contacts.

The pump module 226, which is powered by the motor 225, delivers pressurized hydraulic fluid for distribution by the manifold 228. The manifold provides a hydraulic circuit, including hoses 240, 242, to power a hydraulic motor, in particular a double-acting hydraulic actuator 244 which is a part of the cutter head 230. The manifold 228 also has ports 246, 247 which are accessible from a side of the tool. The ports 246, 247 have one or more dropless quick couplers for attaching external hydraulic hoses 250, 252 to power an external device 253. The operator can direct pressurized fluid to the ports 246, 247 by operating a valve handle 248 on the side of the tool. The valve handle 248 controls a valve 249 in the manifold.

An auxiliary mechanical pump 255 is provided inside the manifold 228 to be used if the electric pump module 226 is inoperable or to provide pressure above the amount that can be provided by the electrical pump 226. A pump handle 254 is pivotally connected to the manifold 228 by brackets 256, 260. A push rod 258 connects the auxiliary pump 255 to the handle 254 by a pivotal connection to the bracket 260. The mechanical pump 255 is operated by repeatedly raising and lowering the pump handle 254. Pressure relief valves 262, 264 are provided to prevent overloading of the hydraulic circuits.

The cutter head 230 includes a frame 266 which, in the illustrated embodiment, comprises the body 280 of the hydraulic actuator 244, two parallel track arms 268, 269 which extend from and are rigidly connected to the body 280 of the hydraulic actuator 244, and a pin 278 which extends through openings in the arms 268, 269. Each arm defines a slot 281 which receives an outer extension of the pin 294. The slots 281, which may be channels of limited depth as illustrated or slots which extend entirely through the arms 268, 269, serve as cams or tracks that direct the motion of the pin 294, the outer extensions of the pin 294 serve as followers that follow the paths provided by the slots 281.

The illustrated actuator 244 is a double acting hydraulic cylinder having a body 280 which defines two ports 282, 284 that communicate with the hoses 240, 242 and that has a first end 273 and second end 285. A piston (not shown) is located inside the body 280 between the ports 282, 284 and is connected to a piston rod 288 that extends through an opening defined by the second end 285 of the body 280. A clevis bracket 290, mounted at the outer end of the rod 288, defines two openings 292 which receive a pin 294.

The pin 294 pivotally secures three linkage arms 296, 298, 300 to the piston rod 288 with arm 300 sandwiched between arms 296, 298. Each of the arms is elongated and defines two openings to receive pivot pins. In each case, one of the openings receives the pin 294. The other of the openings of arms 296, 298 receives a pin 320 which pivotally connects the arms 296, 298 to a cutter blade 324 that is received between the arms 296, 298.

The blade 324 defines two openings. A first opening receives the pin 320 and a second opening receives the pin 278 in such a manner that the blade 324 can pivot about both pins. The pin 278, which extends generally perpendicularly to the finger opening 232 and grip 233, pivotally secures the cutter head 230 to the housing 231. The support member or housing 231 defines two, spaced-apart openings 326, one of which appears in FIG. 5. The outermost portions of the pin 278 extend outwardly from the arms 268, 269 and act as two opposed, outwardly-extending trunnions which are journaled in the openings 326 so that the cutter head, including the frame 266, can rotate relative to the support member 231.

As best seen in FIG. 8, the blade 324 has two curved cutting edges 330, 332 that lie in parallel planes and that are directly opposed and of identical curvature. A concave surface 334 extends between the edges. The edges 330, 332 extend to piercing points 340, 342 at the outermost end of the blade.

The second opening of arm 300 is located between two anvil blades 350, 352 each of which defines a first opening 354. A pin 346 extends through these openings and pivotally connects the arm 300 to the anvil blades 350, 352. The blades 350, 352 also define second openings 356 which receive the pin 278 so that the blades 324, 350, 352 are pivotally secured together and to the housing 231. The axes of the pins 278, 294, 320, and 346 are axes of rotation, all of which extend in parallel to one another in the illustrated embodiment.

Figure 11B:
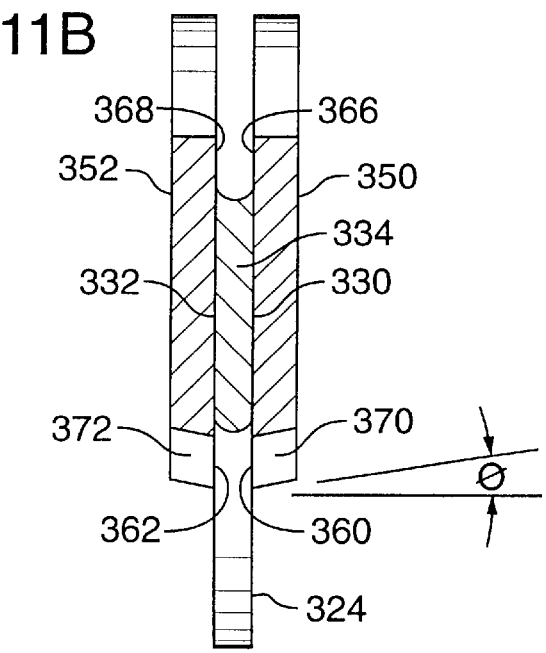
FIG. 11B is an enlarged, partial vertical sectional view taken along line 11—11 of FIG. 10B.
Figure 12:
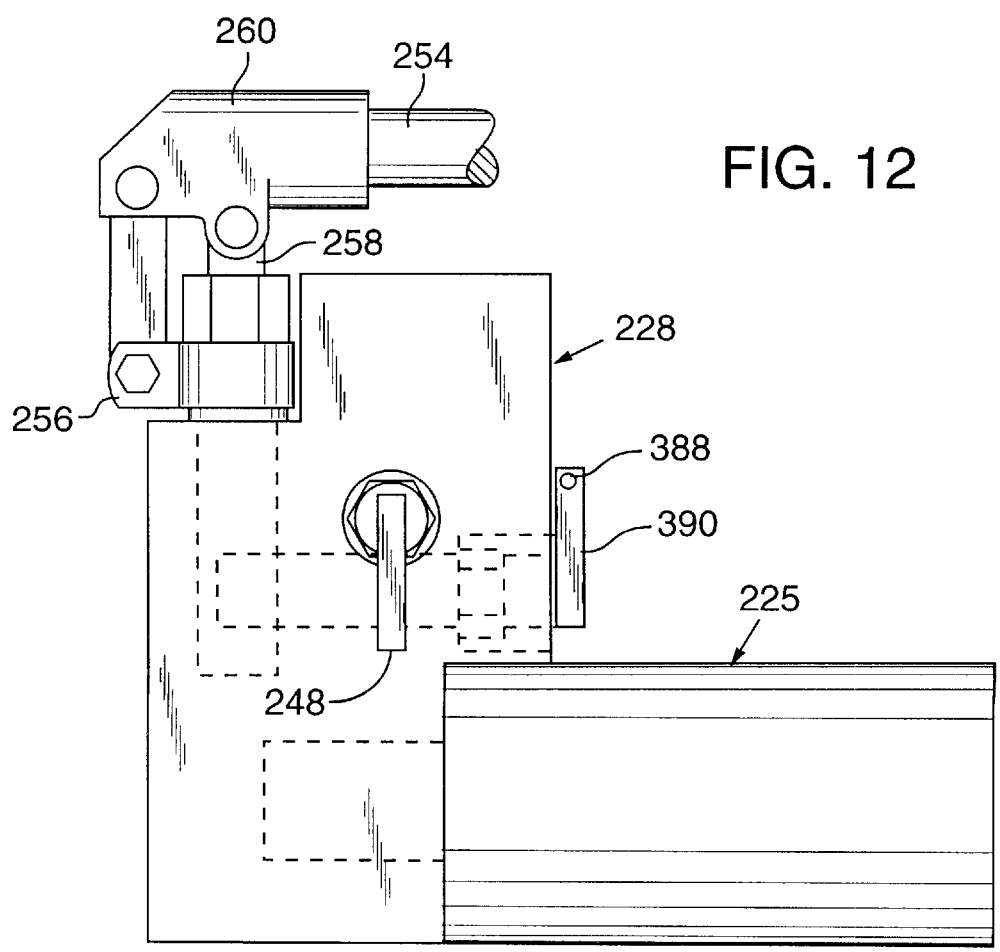
FIG. 12 is an enlarged, side elevational view of the manifold and pump of the rescue tool of FIG. 5.
Figure 13:
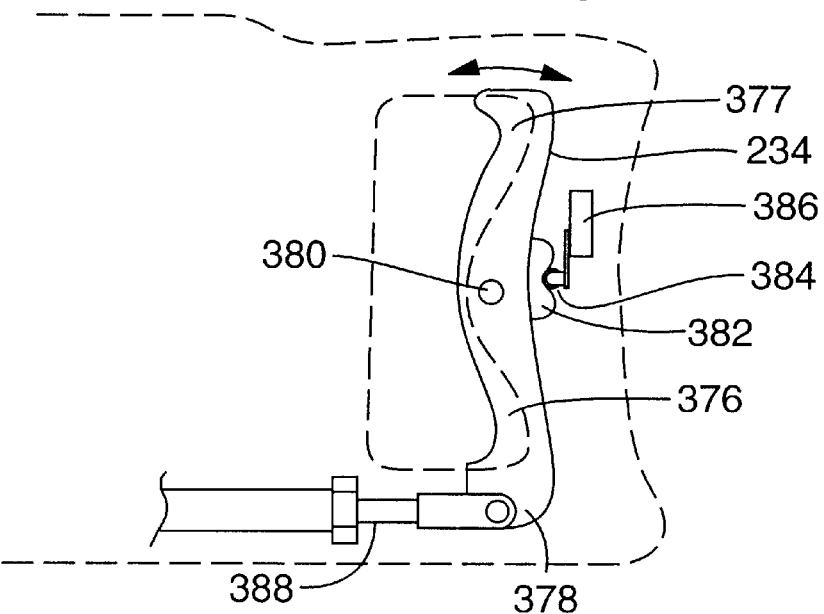
FIG. 13 is and enlarged, side elevational view of the hand switch of the rescue tool of FIG. 5.
Figure 14:
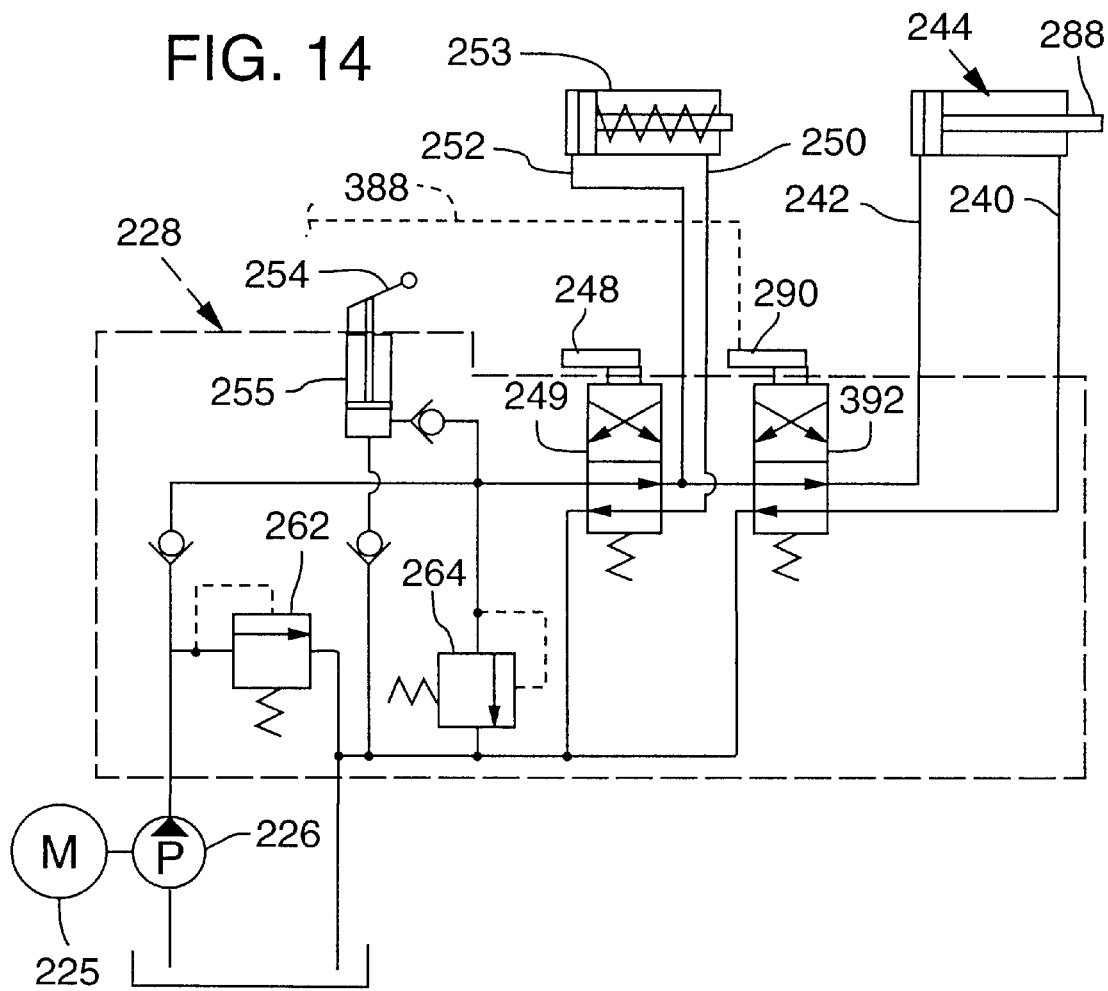
FIG. 14 is a hydraulic circuit diagram for the rescue tool of FIG. 5.

The blades 350, 352 have cutting edges 360, 362 that lie in parallel planes and that are directly opposed and of identical curvature. Spacer 358, 359 are secured between the anvil blades 350, 352 by screws or bolts to maintain the cutting edges 360, 362 a precise distance apart. The cutting edges 360, 362 are at the intersections of inner side faces 366, 368 of the blades 350, 352 and end faces 370, 372 of those blades. The end faces 370, 372 are not perpendicular to the side faces 366, 368, but instead slope back from the side faces at a small angle Ø as shown in FIG. 11B. Blades of the embodiment of FIGS. 1–4 also have sloping faces to facilitate cutting.

FIGS. 12–15 show details of the hydraulic and electrical control apparatus. The hand switch 234 includes a handle 376 which has an upper portion 377 and a lower portion 378. The handle 376 is pivotally mounted to rock about a pin 380 which is located between the upper and lower portions 377, 378 and which secures the handle 376 to the handgrip 233. This handle 376 is connected to both the electrical and hydraulic control systems. On an enclosed surface of the handle 376 is a cam 382 which cradles a cam follower 384. The follower 384 is connected by a lever arm to a microswitch 386 in the electrical circuit which supplies current to the motor 225. When the switch handle 234 is in a centered or first handle position, the follower does not exert sufficient force on the lever arm to close the contacts of the microswitch 386 so the motor does not operate. If the operator squeezes the upper portion 377 so that the upper portion rocks toward the handgrip 233 to a second handle position, the follower 384 moves along the cam 382 to a position where additional force is applied to the lever arm and the switch 386 closes and activates the motor 225 and causes the pumping of hydraulic fluid. Similarly, if the operator squeezes the lower portion 378 of the handle 376 so that the lower portion rocks toward the handgrip 233 to a third handle position, the follower 384 moves along the cam 382 to a position where additional force is applied to the lever arm and the switch 386 closes and activates the motor 225 and causes the pumping of hydraulic fluid. Thus, the motor 225 operates when the handle 376 is in either the second or third positions.

The handle 376 also controls the direction of jaw movement by means of a sheathed cable 388 that connects the handle 376 to a lever 390 on the manifold 228. The lever controls a spool valve 392 which controls the direction of flow of hydraulic fluid to and from the actuator 244. When the handle is moved to the second position, the cable 388 is extended (moved to the left in FIG. 13) which rotates the lever to a position where the valve 392 channels hydraulic fluid from the pump 226 through the line 240, which causes the rod 288 to retract and the jaws to open. Conversely, when the handle is moved to the third position, the cable 388 is retracted (moved to the right in FIG. 13) which rotates the lever to a position where the valve 392 channels hydraulic fluid from the pump 226 through the line 242, which causes the rod 288 to extend and the jaws to close.

A midsection handle 400 is provided to help control the tool. The handle 400 is preferably located at about the center of gravity of the tool so that the operator can support the tool by the handle 400, while tilting it to a desired angle using the handle 222. The illustrated handle has pivot mountings 402 that allow the handle 400 to be tilted fore and aft to a position most convenient to the operator. The handle can be locked in any of several positions by a latch mechanism (not shown).

It is a highly useful feature of the embodiment of FIGS. 5–14 that the cutter head 230 is mounted to pivot relative to the casing 231 about the axis of the pin 178. Rescue cutting tools must be very sturdy in order to exert the force required to cut through metal; this means the such tools are somewhat bulky and can be quite awkward to hold. Since the location of the workpiece dictates the necessary orientation of the cutter head, the tool may need to be held in a very awkward position, from the prospect of the operator, when the tool has a fixed cutter head as does the tool shown in FIGS. 1–4.

The tool of FIGS. 5–14 has a cutter head 230, comprising an anvil member and a cutting blade mounted such that the cutting blade and the anvil member can be rotated relative to one another about an axis of rotation. The cutter head is pivotally mounted on a support member so that both the anvil member and the cutting blade can rotate/tilt through an arc Θ between jaws-raised and jaws-lowered positions as shown by broken and solid lines in FIG. 10B. This range of free movement, which can occur while the anvil member and the cutting blade are being rotated relative to one another about the axis of rotation to perform a cutting operation, allows the handle section 222 and cutter head 230 to be independently positioned at favorable orientations with regard to the operator and workpiece. Since the actuator 280 pivots with the rest of the cutter head 230, the rod 288 can be moved (and the tool operated) when the cutter head is in the jaws-raised position, in the jaws-lowered position, and everywhere in between.

Figure 15:
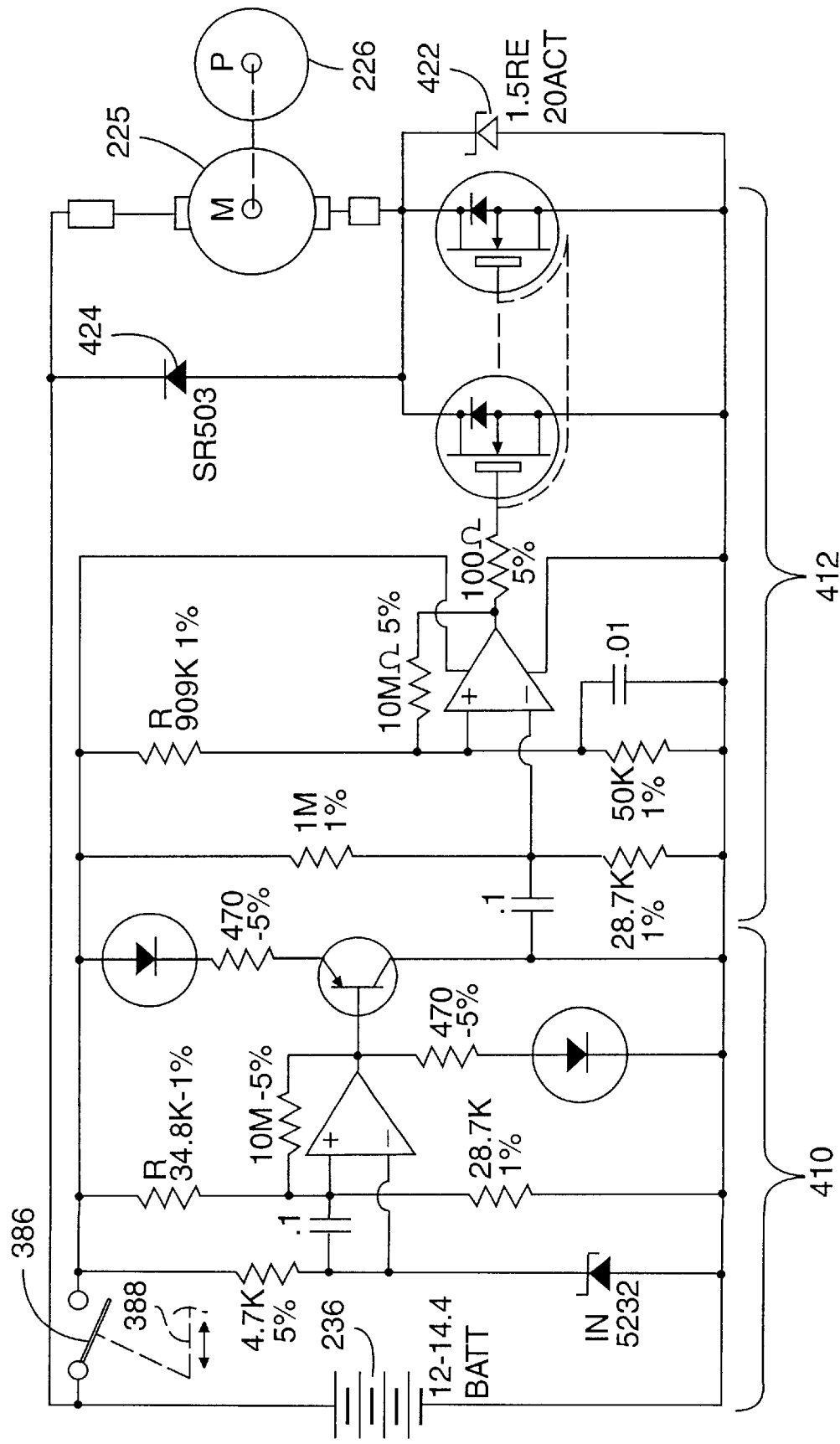
FIG. 15 is a an electrical circuit diagram for the rescue tool of FIG. 5.

FIG. 15 is an electrical circuit diagram. The circuit has a first section 410 which includes light emitting diodes to indicate battery status and a second section 412 which is a motor controller. The battery status portion of the circuit responds when voltage drops to below 12.1 volts, at which point the "low battery" LED is turned on and the "high battery" LED is turned off. The motor controller section 412 responds electrically when the switch 386 is moved between the open and closed positions. When the switch 386 is open, the power MOSFETs do not conduct so that current can not flow to the motor 225. When the switch 386 is closed, the power MOSFETs are rendered conductive so that current flows to the motor and the motor operates. The diode 422 limits voltage across the motor, and the diode 424 prevents reverse feedback through the motor. Preferably, the electrical circuit is designed so that the tool ceases operation when the available voltage drops below 11.1 volts. The stopping of operation signals the operator to change to a new battery pack before there is a substantial drop in performance.

To operate the tool, an operator first determines whether it is desirable to perform a cutting operation using the cutter head 230 or whether an auxiliary tool should be used. If the cutter head is to be used, the valve 249 which controls flow to the auxiliary ports 246 is closed by moving the handle 248 to the "off" position or leaving the handle in that position. Next the hand switch 234 is operated. Rocking the hand lever 234 in one direction causes the blades 324, 350, 352 to open. Rocking the hand lever 234 in the opposite direction causes the blades to close.

If the tool is stored with the blades in the closed position, the operator operates the hand lever 234 to open the blades. Next the tool 220 is positioned so that the object to be cut is received between the upper blades 350, 352 and the lower blade 324. The operator then rocks the hand lever 234 to the position which causes the blades to close, that is, to move from the position shown in FIG. 10A to the position shown in FIG. 10B. This operation involves the pumping of hydraulic fluid through the line 242 and into the actuator 244. (If the tool fails to respond due to an electrical failure when the lever 234 is tilted, the same effect can obtained by tilting the lever 234 and pumping the hand pump 255). The fluid pumped into the actuator causes the rod 288 to extend and push the pin 294 away from the actuator so that the ends of the pin 294 move along the tracks 281. This motion of the pin 94 causes the pins 320, 346 to move away from each other, thereby rotating the blade 324 about the pin 278 relative to the anvils 350, 352.

As the blades move toward the closed position, the object to be cut is first grasped by the piercing points 340, 342 which anchor the object against the anvil blades 350, 352. The cut proceeds with the cutting edges 330, 332 of the blade 324 overlapping and traveling along the cutting edges 360, 362 of the blades 350, 352. When the blades 324, 350, 352 completely overlap, an elongated bite or strip of limited length has been taken out of the object to be cut. After a first strip is cut from the object, if necessary, a second bite can be taken from the same object by opening the blades, sliding the blade 324 forward into the gap left by removal of the first bite, and then closing the blades to take a second bite.

If an auxiliary tool is to be used, the valve 249 which controls flow to the auxiliary ports 246 is opened by moving the handle 248 to the "on" position or leaving the handle in that position and connecting hoses 250, 252 from the auxiliary tool 253 to the ports 246. Next the hand switch 234 is operated. Rocking the hand lever 234 causes hydraulic fluid to be pumped to one of the ports 246 to supply pressurized hydraulic fluid to the auxiliary tool. If the auxiliary tool requires a greater amount of hydraulic pressure than can be supplied by the motor driven pump 226, the hand pump 225 can be operated to supply additional pressure.

FIGS. 16–27 illustrate a third rescue tool. The tool comprises a cutter module 530 and a power module 531 which has battery packs 536, an electrically-powered motor 525, a hydraulic pump 526, and a hydraulic fluid manifold 528.

The cutter module 530 is sized and shaped so that it can be held and easily manipulated by a rescue worker. A handle section 522 has a finger grip portion 533. A three-position rocker switch with spring-loaded centering 534 is located on the handle 522 so that the operator can control the hydraulic and electrical systems of the tool. The switch 534 is connected by an electrical cable 532 into an electrical circuit that connects the battery pack 536 to the electric motor 525.

The power module 531 is contained in a frame made of tubular metal, such as steel or titanium. Front and rear wall panels 546, 547 are supported on two generally rectangular frame members 548, 549 made of the metal tubing. Spacer tubes 550 connect the rectangular frame members and hold them in position. Advantageously, fasteners 552 are provided on one of the wall panels 546, 547 and/or frames 548, 549. The fasteners are useful to mount the power module 531 on a back pack frame so that a rescue worker can carry the power module in the manner of a back pack. For tools to be used by firefighters, the power module can be attached to a pack frame having the same shoulder strap configuration as the frames that the firefighters use for carrying air tanks. This will make the system easy to use by a firefighter who is familiar with wearing air tanks.

Battery receptacles 524 are provided inside the power module 531 to contain the rechargeable battery packs 536. The battery packs are made of an impact-resistant plastic material and are shaped to conform to the walls of compartments 537 provided by the receptacles 524. As shown in the drawings, the side walls of the battery packs are slightly tapered and the side walls of the receptacles are slightly flared for easy insertion and removal of the battery packs. Also, the battery packs 536 are shaped so that they can be installed in only one orientation. In the illustrated battery packs 536, two parallel rails 556 extend from one side wall where they are positioned to be received in two parallel groves 558 which are defined at the top of each receptacle 524. The mating rails 556 and grooves 558 serve to prevent a battery pack from being inserted upside down. Two spring loaded electrical contacts 551 at the back of each receptacle are positioned to mate with two electrical contacts 555 on the back of a battery pack.

Each battery pack is held in place by a latch mechanism so that a battery pack 536, when installed, is latched in place and fills a compartment with one wall 538 of the battery pack forming a portion of the side of the receptacle. The illustrated latch mechanism includes a battery handle 539 which is rotatably mounted on the wall 538 and which has two axially projecting ears 541 and a hand grip 543. After a battery pack 536 is inserted into a receptacle 524, the handle can be rotated by a user who grasps the grip 543. As the handle is rotated, the ears 541 are wedgingly received in slots or grooves 545 located at the top and the bottom of the receptacle 524 to hold the battery pack 536 in place. Because the receptacles 524 are visible from outside of the power module 531, the absence of a battery pack will be readily apparent to the operator.

A power source other than the battery pack can be used in an emergency situation. When a battery pack is removed, its receptacle's electrical battery contacts 551 are exposed. Any source of sufficient electrical current can be connected to the contacts 551 to power the tool. The preferred electrical system operates at twelve volts, so an automotive battery can be wired to the contacts for operation of the tool when no charged battery packs are available. To facilitate such emergency operation, it is helpful for the tool electrical circuit to contain overload protection and to have the ability to operate regardless of the polarity of the power source connections to the battery contacts 551. To make the connection easily, an adapter (not shown) can be provided in the shape of a battery back. The adaptor can be inserted into a battery receptacle 524 so that two electrical contacts on the adaptor engage the contacts 551 of the receptacle. Electrical cables, preferably having alligator-type clips at their distal ends, can be provided to extend from the adaptor and connect the contacts of the adaptor to a remote source of electricity, such as an automobile battery.

The pump 526, which is powered by the motor 525, delivers pressurized hydraulic fluid for distribution by the manifold 528. The manifold serves as part of a hydraulic circuit which includes hoses 540, 542. The hoses deliver hydraulic fluid from the power module 531 to a hydraulic motor, in particular to a hydraulic actuator 544 which is a part of the cutter head module 530. The hoses 540, 542 are connected to the manifold 528 by dropless quick couplers. The hoses 540, 542 and the electrical cable 532 are contained in a central passageway defined by a tubular sheath 554 made of a fabric woven from flexible plastic material such as Kevlar filaments. The sheath 554 extends between the cutter module 530 and the power module 531 to protect the hoses 540, 542 and cable 532 from abrasion. Two other hoses 557 connect the manifold 528 to a supply of hydraulic fluid in a reservoir 559 covered by a lid 561. A filler tube 563 is provided to drain and add hydraulic fluid as needed. A cap 565 with a dip stick (not shown) is provided to close the opening to the filler tube 563 and measure the level of hydraulic fluid in the reservoir 559. In an alternative construction, the hydraulic system, including the reservoir, is tightly sealed.

The cutter module 530 includes a frame 566 which, in the illustrated embodiment, comprises the body 580 of the hydraulic actuator 544, two parallel track arms 568, 569 which extend from and are rigidly connected to the body 580 of the hydraulic actuator 544, and a pin 578 which extends through openings in the arms 568, 569. Each arm defines a slot 581 which receives an end portion of a pin 594. The slots 581 extend entirely through the arms 568, 569 and serve as cams or tracks that direct the motion of the pin 594. End caps 595 are mounted on the ends of the pin 594. The end caps serve as followers that follow paths provided by outwardly-opening channels 597 on the arms 568, 569.

The illustrated actuator 544 is a hydraulic cylinder having a body or housing 580 which defines two fluid-receiving openings or ports 582, 584 that communicate with the hoses 540, 542 via dropless quick couplers (not shown). The cylinder body 580 has a first end 573 and second end 585 and a cylindrical inner surface 601 which defines a chamber 602. A piston 599 is located inside the chamber 602 between the first and second ends 573, 585 and has a surface portion 603 which is shaped to conform to the cylindrical inner surface 601 of the housing 580 so that a fluid tight extension stroke cavity 604 is provided between the piston 599 and the first end 573. The piston 599 is constructed to move axially inside the chamber 602 and is connected to a piston rod 588. The rod 588 has a cylindrical outer surface 625 and slidably extends through a rod-receiving opening 605 defined at the second end 585 of the body 580. The rod 588 has an axially-extending bore 606 which is a rod chamber defined by a cylindrical inner surface 607 of the rod 588. The rod 588 also has first and second ends 608, 609 and defines a core-receiving opening 610 at its first end 608. Extending into the rod chamber 606 is an elongated, cylindrical core 611. The core 611 has a cylindrical outer surface 612 and first and second ends 613, 614. The core 611 slidably extends into the rod chamber 606 via the core-receiving opening 610.. The core 611 has an axially-extending bore 615 which is a core chamber defined by a cylindrical inner surface and is connected to the port 582. In the illustrated tool, the longitudinal axes $A_3$ of the bores 606, 615 are the same as the axes of the piston 599 and cylindrical inner surface 601 of the housing 580. Thus, the surfaces 601, 603, 607, 612, and 625 are concentric. The core 611 has a seal portion 616 located inside the rod chamber 606 between the first and second ends 608, 609. The seal portion 616 has an annular surface 617 which is shaped to support ring seals which conform to the cylindrical inner surface 607 of the rod so that a fluid tight retraction stroke cavity 618 is provided between the seal portion 616 and the first end 608. The seal portion 616 is constructed to move axially inside the rod chamber 606. The first end 613 of the core 611 is attached to the housing 580 at a location outside the rod chamber 606.

Ring seals 619 are provided between the inner surface 607 of the rod and the seal portion 616 of the core 611. Another seal assembly 621, which may also employ ring seals, is provided between the inner surface 601 of the housing 580 and the piston 599. An annular, radially outwardly-facing channel 622 is defined in the cylindrical surface of the piston 599. The channel 622 faces the cylindrical inner surface 601 and communicates with the extension stroke cavity 604 via passageways 623 through the piston 599. When the piston 599 is being moved toward the second end 585, there is hydraulic fluid under pressure in the extension stroke cavity 604 so that fluid under pressure is also in the channel 622 and provides a floating seal.

A clevis bracket 590, mounted at the outer end of the rod 588, defines two openings 592 which receive a pin 594. The pin 594 pivotally secures three linkage arms 596, 598, 600 to the piston rod 588 with arm 600 sandwiched between arms 596, 598. Each of the arms is elongated and defines two openings to receive pivot pins. In each case, one of the openings receives the pin 594. The other of the openings of arms 596, 598 receives a pin 620 which pivotally connects the arms 596, 598 to a cutter blade 624 that is received between the arms 596, 598.

Figure 17A:
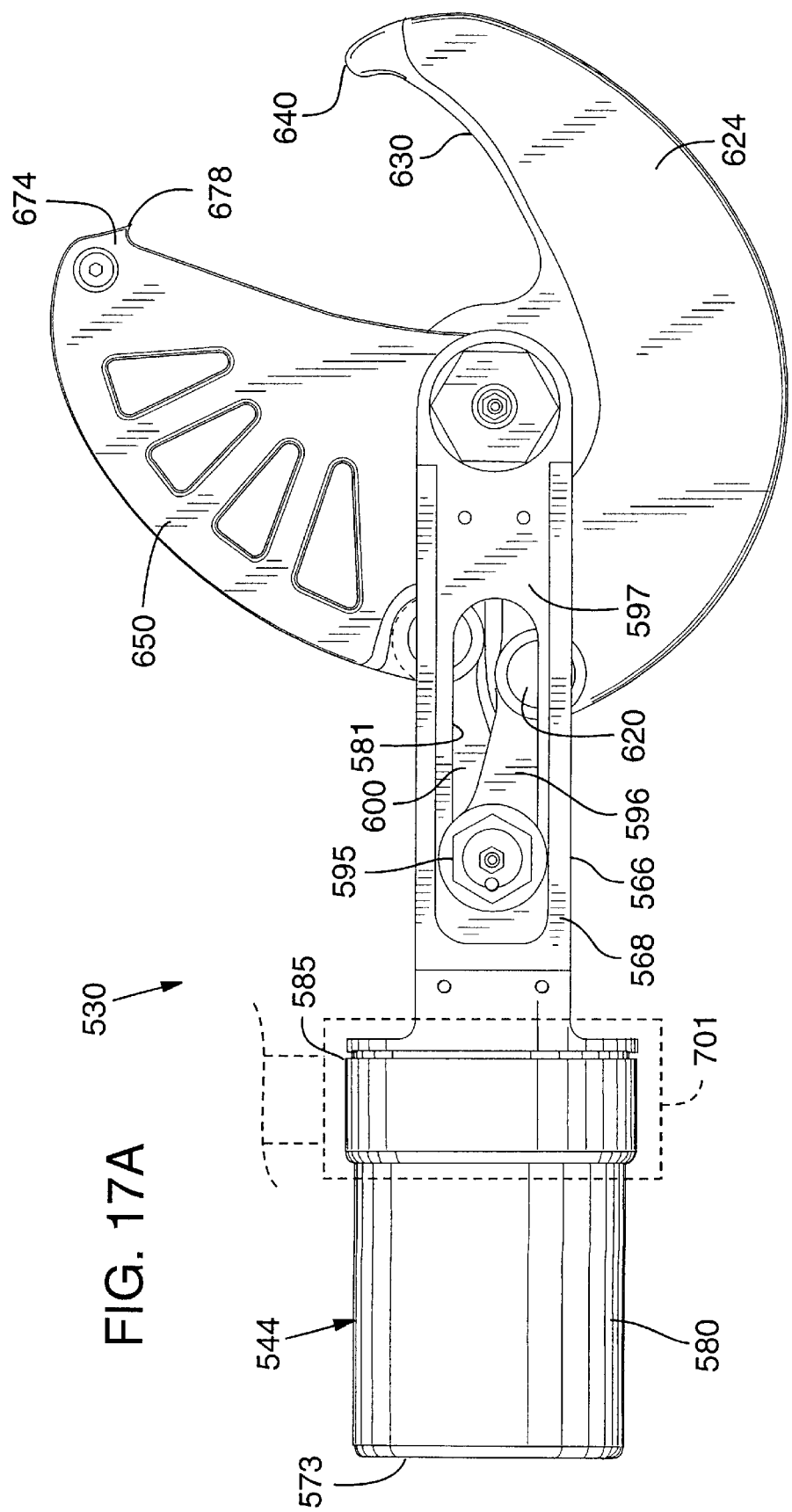
FIGS. 17A and 17B are enlarged, partial side elevational views of the cutter module of FIG. 16, with cutting head members in open and closed positions respectively.
Figure 17B:
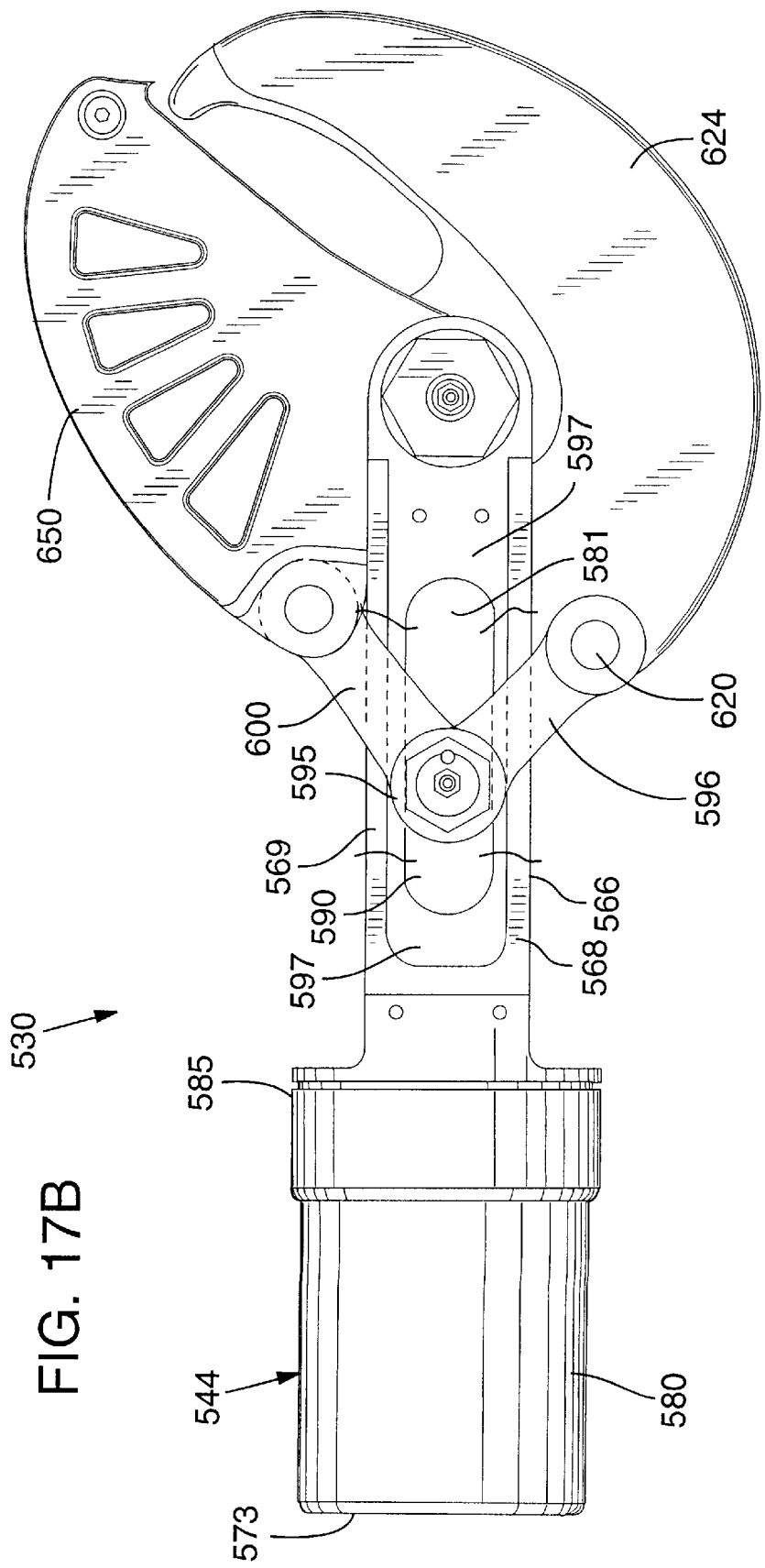
Figure 18:
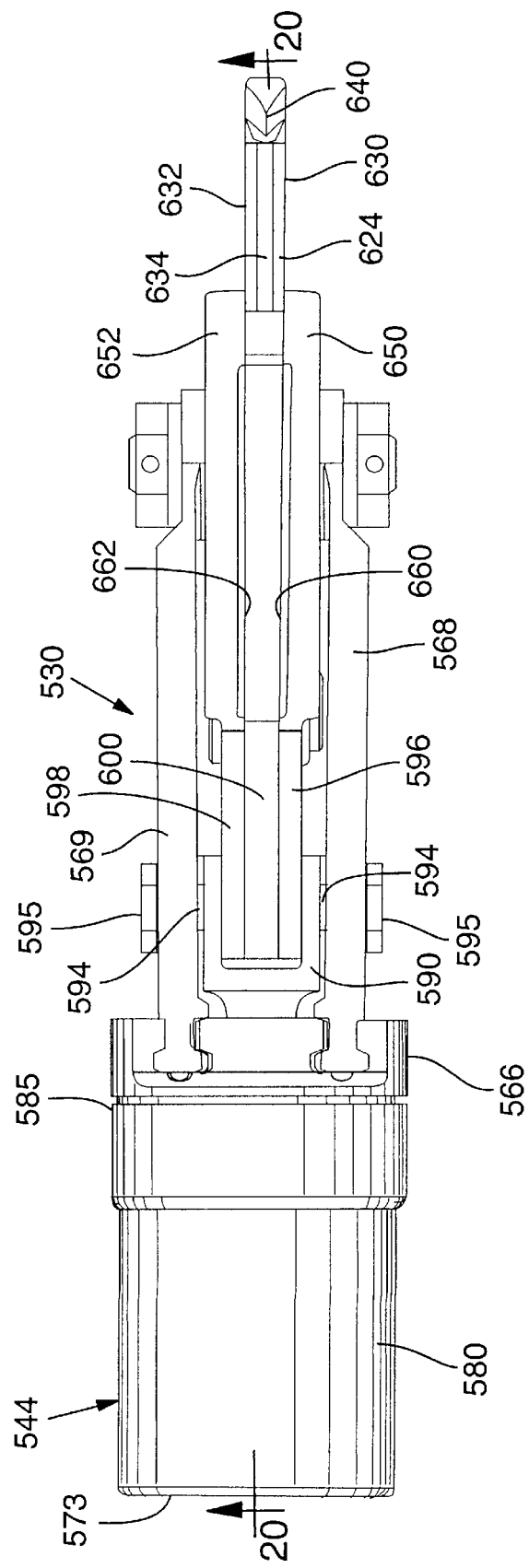
FIG. 18 is a top plan view of the cutter module of FIGS. 17A and 17B.
Figure 19:
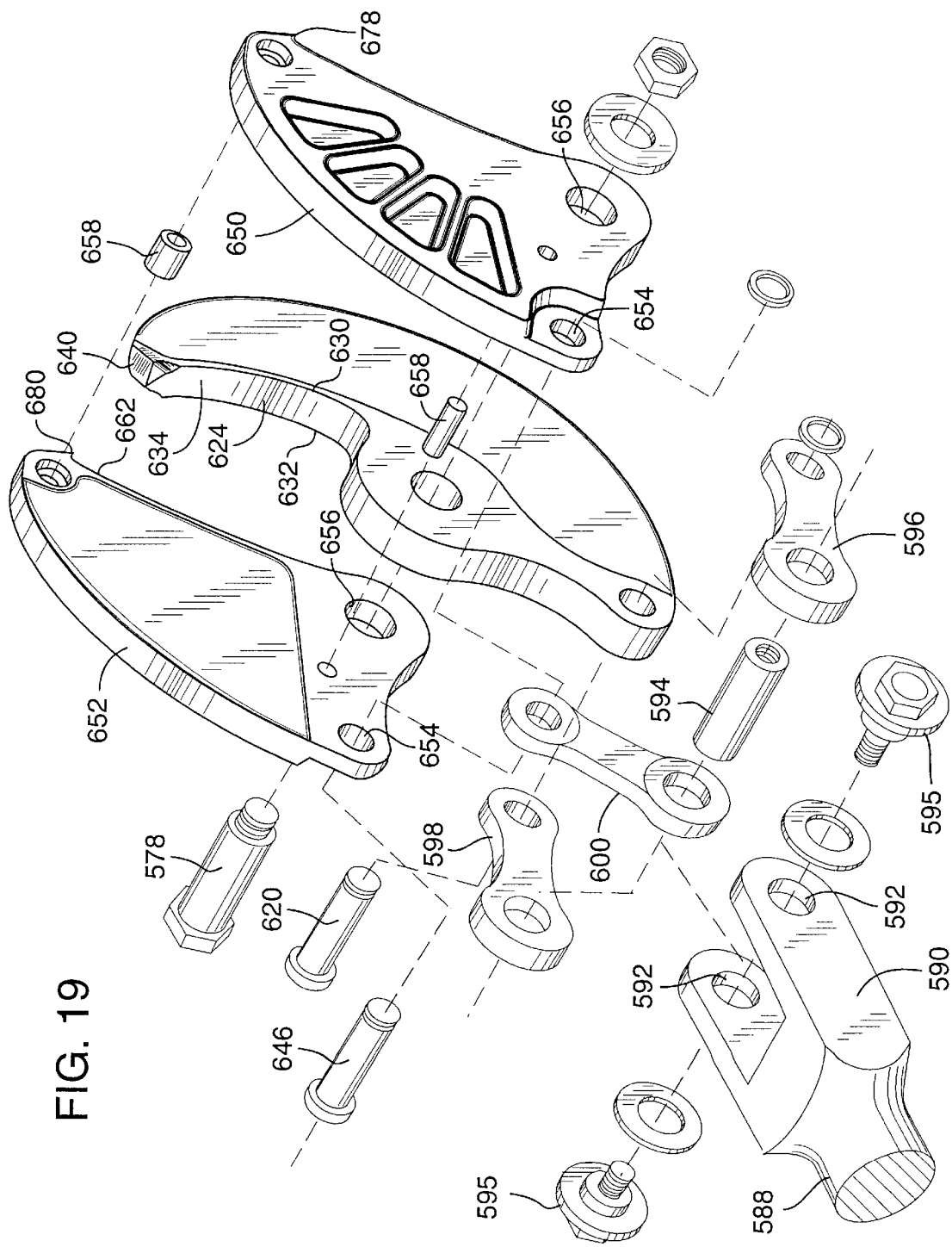
FIG. 19 is a partial exploded view of the cutter module of FIGS. 17A and 17B.
Figure 21:
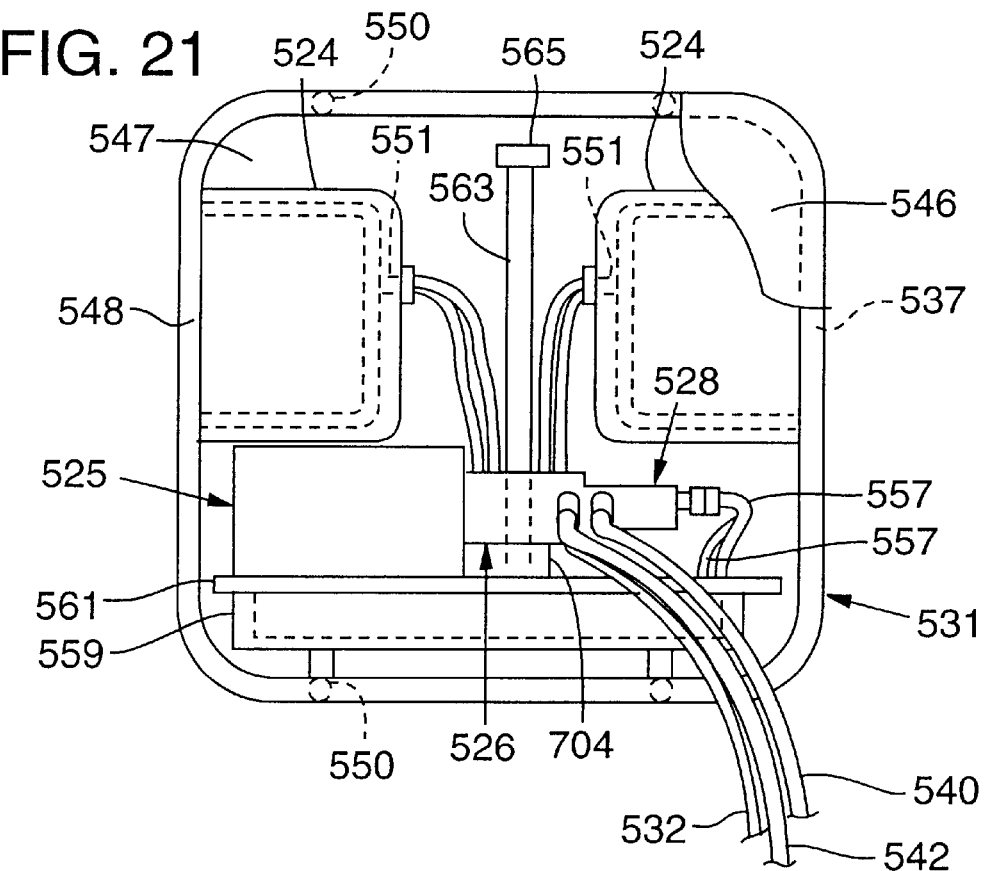
FIG. 21 is a front elevational view of a power module of the third rescue tool, with a portion of the foreground panel structure removed to show interior detail.
Figure 22:
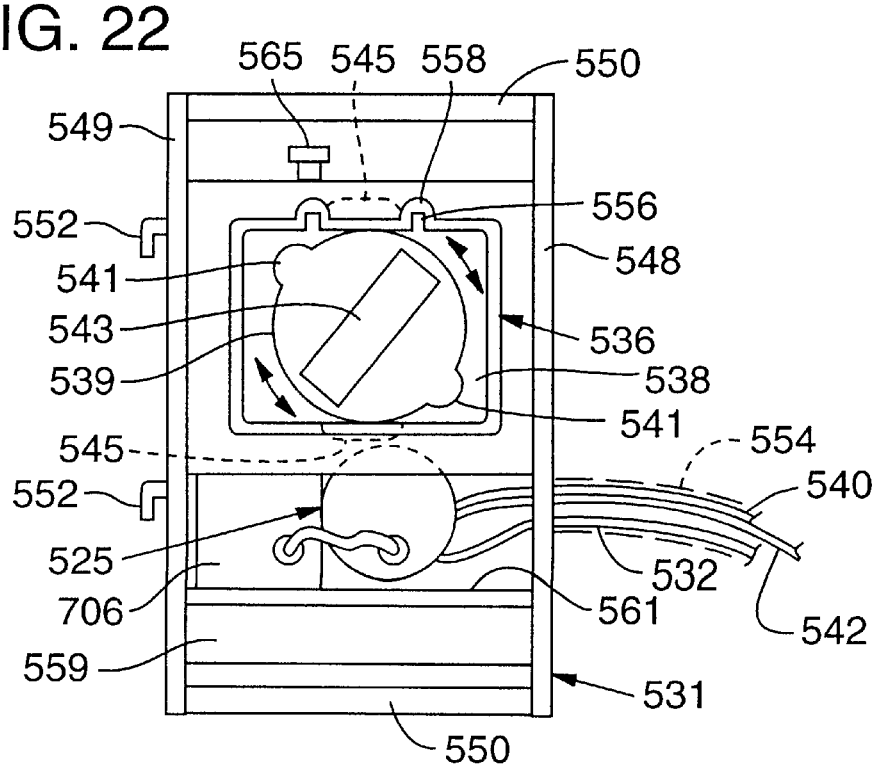
FIG. 22 is a left side elevational view of the power module of FIG. 21.

The blade 624 defines two openings. A first opening receives the pin 620 and a second opening receives the pin 578 in such a manner that the blade 624 can pivot about both pins. The pin 578, which extends generally perpendicularly to the axis $A_1$ of the handle 522, pivotally secures the blade 624 to the arms 568, 569. The blade 624 has two curved cutting edges 630, 632 that lie in parallel planes and that are directly opposed and of identical curvature. A concave surface 634 extends between the edges. The edges 630, 632 extend to a wedge-shaped piercing tooth or point 640 at the outermost end of the blade. When the blades are in an open position as shown in FIG. 17A, the tooth 640 extends from the cutting blade 624 toward two anvil blades 650, 652.

The second opening of the arm 600 is located between the two anvil blades 650, 652 each of which defines a first opening 654. A pin 646 extends through these openings and pivotally connects the arm 600 to the anvil blades 650, 652. The blades 650, 652 also define second openings 656 which receive the pin 578 so that the blades 624, 650, 652 are pivotally secured together and to the arms 568, 569. The axes of the pins 578, 594, 620, and 646 are axes of rotation, all of which extend in parallel to one another in the illustrated embodiment.

The blades 650, 652 have cutting edges 660, 662 that lie in parallel planes and that are directly opposed and of identical curvature. Spacers 658 are secured between the anvil blades 650, 652 to maintain the cutting edges 660, 662 a precise distance apart. The cutting edges 660, 662 are at the intersections of inner side faces of the blades 650, 652 and end faces of those blades. The end faces are not perpendicular to the side faces but instead slope back from the side faces at a small angle Ø in the manner of the assembly shown in FIGS. 11A and 11B.

Near the distal ends of the blades 650, 652 are hook-like projections or hook members 674, 676, which provide grasping edges 678, 680. The hook members 674, 676 extend from the anvil blades 650, 652 in a direction such that, when the cutting edges 630, 632 of the blade 624 are spaced apart from the cutting edges 660, 662 of the anvil blades 650, 652 as shown in FIG. 17A, the grasping edges 678, 680 face the cutting blade 624. The grasping edges 678, 680 are aligned such that the hook members 674, 676 can grasp an object against the cutting blade 624 before the cutting edges commence cutting the object. As a result of this arrangement and the shape of the cutting edges, the tool of the present invention starts making its cut at a location distant from the motor 530 and then cuts progressively toward the motor. Once an object is grasped, it is held steady or pulled toward the motor. This is unlike scissors-type blades were forces on the workpiece push it away from the tool as a cut progresses.

A midsection handle 700 is provided to help control the cutter module. The handle 700 is preferably located at about the center of gravity of the cutter module. The illustrated handle is mounted on a swivel collar 701 which is constructed to rotate freely around the longitudinal axis $A_1$ of the cutter module. The handle 700 is also mounted to rotate relative to the collar 701 about a radial axis $A_2$. The handle 700 can be locked in any position convenient to the operator by a latch mechanism (not shown).

It is a highly useful feature of the embodiment of FIGS. 16–20 that the cutter module 530 is compact and relatively light weight. Since the location of the workpiece dictates the necessary orientation of the cutter head, it may need to be held in a very awkward position. The cutter module of FIGS. 16–20 is so small and mobile that it can easily be used in almost any position, even within such confined spaces as the interior of a wrecked automobile.

The electrical circuit of the tool of FIGS. 16–27 is generally similar to that illustrated in FIG. 15, except that the switch 534 not only controls the supply of current to the motor 525, but also causes a solenoid 704 to move a rotary valve (not shown) inside the manifold 528. The circuit board is contained in a housing 706 located near the motor 525 and solenoid 704.

To operate the tool, the switch 534 is operated. When at rest, the switch 534 is centered by springs in a first position. When the switch is in the first position, the electrical circuit is open so that no fluid is pumped. Rocking the switch 534 in one direction causes the blades 624, 650, 652 to open. Rocking the switch 534 in the opposite direction causes the blades to close. In the second and third positions, the switch causes the motor 525 to operate and thereby pump hydraulic fluid. When the switch 534 is in the second position, it causes the electric motor 525 to operate and causes the solenoid 704 to move the rotor of the axial flow rotary valve inside the body of the manifold 528 so that hydraulic fluid exerts pressure on an element of a hydraulic motor in one direction. When the switch is moved to the third position, it causes the electric motor 525 to operate and causes the solenoid 704 to move the rotor of the axial flow rotary valve inside the body of the manifold 528 so that hydraulic fluid exerts pressure on an element of the hydraulic motor in the opposite direction. When the switch is in the first position, the motor 525 does not operate and the valve rotor is moved to a position where pressure inside the hoses 540, 542 is relieved.

If the tool is stored with the blades in the closed position, the operator first operates the switch 534 to open the blades. Next the cutter module 530 is positioned so that the object to be cut is received between the upper blades 650, 652 and the lower blade 624. The operator then rocks the switch 534 to the position which causes the blades to close. This operation involves the pumping of hydraulic fluid through the line 542 and into the extension cavity 604 actuator 544. The fluid pumped into the actuator causes the rod 588 to extend and push the pin 594 away from the actuator so that the ends of the pin 594 move along the slots 581. This motion of the pin 594 causes the pins 620, 646 to move away from each other, thereby rotating the blade 624 about the pin 578 relative to the anvils 650, 652.

As the blades move toward the closed position, the object to be cut is first grasped between the piercing point 640 and the edges 678, 680 which anchor the object between the blade 624 and the anvil blades 650, 652. The cut proceeds with the cutting edges 630, 632 of the blade 624 overlapping and traveling along the cutting edges 660, 662 of the blades 650, 652. The curvatures of the edges 630, 632, 660, and 662 are such that, as the blades move toward the closed position, the junction of each edge 630, 632 of the blade and the corresponding edge 660, 662, of the adjacent anvil moves at a constant speed as the workpiece is cut. As resistance increases during the process of a cut, the cutting force increases in proportion to maintain continuous cutting. A pressure relief valve (not shown) in the manifold 528 limits the hydraulic pressure in the system to prevent damage to tool components. When the blades 624, 650, 652 completely overlap, an elongated bite or strip of limited length has been taken out of the object to be cut.

After a first strip is cut from the object, if necessary, a second bite can be taken from the same object. This is accomplished by moving the switch 534 to a the position where it causes the blades to open. This operation involves the pumping of hydraulic fluid through the line 540 and into the retraction cavity 618. The fluid pumped into the cavity 618 causes the rod 588 to retract and pull the pin 594 toward the actuator so that the ends of the pin 594 move along the slots 581. This motion of the pin 594 causes the pins 620, 646 to move toward each other, thereby rotating the blade 624 about the pin 578 relative to the anvils 650, 652. In the illustrated tool, the cross-sectional area of the extension stroke cavity 604 is much greater than the cross-sectional area of the retraction stroke cavity 618. This is an advantageous relationship since it causes the blades move most rapidly when they are opening and under no load. The blades move relatively slowly when closing, but provide a relatively large amount cutting power due to the relatively large amount of surface area presented by the piston 599.

After the blades are reopened, the operator slides the blade 624 forward into the gap left by removal of the first bite, and then operates the switch 534 to close the blades to take a second bite.

In view of the above, it is to be understood that the present invention includes all such modifications as may come within the scope and spirit of the following claims.

What is claimed is:

1. A hand manipulatable rescue tool comprising:

a frame that defines a cam path;

an anvil member having a first anvil that is attached to the frame and has a cutting edge and having a second anvil which has a cutting edge shaped the same as the cutting edge of the first anvil, the first and second anvils being spaced apart in fixed positions relative to one another such that the cutting edges face each other and lie in parallel planes;

a cutting blade mounted between the anvils such that the blade and anvil member can be rotated relative to one another, the blade having two spaced-apart cutting edges that are positioned such that, when the blade is moved relative to the anvil member, the cutting edges of the blade overlap and travel along the cutting edges of the anvils;

a pivot member;

a follower that is connected to the pivot member and that is positioned to follow the cam path;

a first link arm, one portion of the first link arm being pivotally mounted to the anvil member and another portion of the first link arm being pivotally mounted to the pivot member;

a second link arm, one portion of the second link arm being pivotally mounted to the cutting blade and another portion of the second link arm being pivotally mounted to the pivot member such that both link arms can rotate relative to the pivot member;

a hydraulic actuator connected to the frame and to the pivot member such that the actuator can be operated to move the pivot member such that the follower moves along the cam path, to vary the location of the pivot member relative to the anvil member and the cutting blade, to cause both the link arms to move relative to the frame, and to rotate the anvil member and the cutting blade in relation to each other;

a conduit for delivering high pressure hydraulic fluid to the actuator;

a pump for pumping hydraulic fluid through the conduit;

an electric motor operatively connected to the pump;

a battery to supply electrical current to the electric motor; and a manually operable switch that controls the flow of electrical current between the battery and the electric motor.

2. A hand manipulatable rescue tool comprising:

a frame that defines two opposed parallel cam paths;

a first cutting member, which is pivotally mounted on the frame and has a cutting edge;

a second cutting member, which is pivotally mounted on the frame, the second cutting member having a cutting edge positioned such that, when the second cutting member is rotated about an axis of rotation, the cutting edge of the first cutting member travels past the cutting edge of the second cutting member;

a pivot member;

first and second followers that are connected to the pivot member and that are respectively positioned so that each cam path is followed by one of the first and second followers;

a first link arm, one portion of the first link arm being pivotally mounted to the first cutting member and another portion of the first link arm being pivotally mounted to the pivot member;

a second link arm, one portion of the second link arm being pivotally mounted to the second cutting member and another portion of the second ink arm being pivotally mounted to the pivot member such that both link arms can rotate relative to the pivot member; and a hydraulic actuator connected to the frame and to the pivot member such that the actuator can be operated to move the pivot member such that the followers move along the cam paths, to vary the location of the pivot member relative to the first cutting member and the second cutting member, to cause both the link arms to move relative to the frame, and to rotate the cutting members relative to one another.

* * * * *